(12) United States Patent
Morishita et al.

(10) Patent No.: US 8,485,730 B2
(45) Date of Patent: *Jul. 16, 2013

(54) ROLLING BEARING

(75) Inventors: Hiroshi Morishita, Kuwana (JP); Takashi Ito, Kuwana (JP); Chikage Akai, Kuwana (JP); Chikara Ohki, Kuwana (JP); Kazuhiro Yagita, Kuwana (JP)

(73) Assignee: NTN Corporation, Osaka (JP)

( * ) Notice: Subject to any disclaimer, the term of this patent is extended or adjusted under 35 U.S.C. 154(b) by 345 days.

This patent is subject to a terminal disclaimer.

(21) Appl. No.: 12/410,821

(22) Filed: Mar. 25, 2009

(65) Prior Publication Data
US 2009/0245706 A1   Oct. 1, 2009

(30) Foreign Application Priority Data

Mar. 27, 2008 (JP) .................................. 2008-083855
Mar. 27, 2008 (JP) .................................. 2008-083856

(51) Int. Cl.
*F16C 33/32* (2006.01)
*F16C 33/58* (2006.01)
*C23C 8/26* (2006.01)

(52) U.S. Cl.
USPC ........... 384/492; 384/569; 384/912; 148/318; 148/906

(58) Field of Classification Search
USPC .............. 384/513, 515, 523, 527, 564, 569, 384/572, 573, 576, 912, 913; 148/318, 333, 148/906; 420/109
See application file for complete search history.

(56) References Cited

U.S. PATENT DOCUMENTS

| | | | | |
|---|---|---|---|---|
| 5,110,257 A | * | 5/1992 | Hibner et al. ................. | 415/119 |
| 5,165,804 A | * | 11/1992 | Fisher et al. ................. | 384/492 |
| 5,672,014 A | * | 9/1997 | Okita et al. ................... | 384/492 |
| 6,142,674 A | * | 11/2000 | Bayer ........................... | 384/482 |

(Continued)

FOREIGN PATENT DOCUMENTS

| JP | 02-057675 | 2/1990 |
|---|---|---|
| JP | 07-118826 | 5/1995 |

(Continued)

OTHER PUBLICATIONS

Japanese Office Action, and English translation thereof, issued in Japanese Patent Application No. 2008-083855 dated Mar. 21, 2012.

(Continued)

*Primary Examiner* — Thomas R Hannon
*Assistant Examiner* — Adam D Rogers
(74) *Attorney, Agent, or Firm* — McDermott Will & Emery LLP

(57) ABSTRACT

An outer ring and an inner ring of a rolling bearing are constituted of steel containing 0.77 to 0.85% of carbon, 0.01 to 0.25% of silicon, 0.01 to 0.35% of manganese, 0.01 to 0.15% of nickel, 3.75 to 4.25% of chromium, 4 to 4.5% of molybdenum and 0.9 to 1.1% of vanadium with the rest consisting of iron and impurities, a nitrogen-enriched layer having a nitrogen concentration of at least 0.05 mass % is formed on a region including a rolling surface, and the total of a carbon concentration and the nitrogen concentration in the nitrogen-enriched layer is at least 0.82 mass % and not more than 1.9 mass %. A DLC coating layer is arranged on a region including an outer ring contact surface.

9 Claims, 21 Drawing Sheets

U.S. PATENT DOCUMENTS

| | | | |
|---|---|---|---|
| 6,158,894 A * | 12/2000 | Pujari et al. | 384/492 |
| 6,179,933 B1 * | 1/2001 | Dodd et al. | 148/222 |
| 6,342,109 B1 | 1/2002 | Takemura et al. | |
| 6,409,464 B1 * | 6/2002 | Fisher et al. | 415/1 |
| 6,471,410 B1 * | 10/2002 | Jacobson et al. | 384/492 |
| 6,742,934 B2 * | 6/2004 | Matsuyama et al. | 384/572 |
| 7,364,365 B2 * | 4/2008 | Begin | 384/530 |
| 8,070,364 B2 | 12/2011 | Beer et al. | |
| 2002/0097939 A1 * | 7/2002 | Matsuyama et al. | 384/572 |
| 2002/0168124 A1 * | 11/2002 | Dusza | 384/475 |
| 2002/0191878 A1 * | 12/2002 | Ueda et al. | 384/492 |
| 2004/0071379 A1 * | 4/2004 | Carrerot | 384/565 |
| 2004/0079448 A1 * | 4/2004 | Rhoads et al. | 148/230 |
| 2004/0179762 A1 * | 9/2004 | Doll et al. | 384/492 |
| 2005/0047694 A1 | 3/2005 | Nozaki et al. | |
| 2005/0141797 A1 * | 6/2005 | Kinno et al. | 384/492 |
| 2005/0207687 A1 * | 9/2005 | Fujita et al. | 384/492 |
| 2006/0153483 A1 * | 7/2006 | Bridges et al. | 384/475 |
| 2010/0239205 A1 | 9/2010 | Ohki et al. | |
| 2012/0014635 A1 | 1/2012 | Ohki et al. | |

FOREIGN PATENT DOCUMENTS

| | | |
|---|---|---|
| JP | 09-003646 | 1/1997 |
| JP | 09-133130 | 5/1997 |
| JP | 10-019045 | 1/1998 |
| JP | 11-082522 | 3/1999 |
| JP | 2000-129347 | 5/2000 |
| JP | 2000-282178 | 10/2000 |
| JP | 2001-152252 | 6/2001 |
| JP | 2002-514719 | 5/2002 |
| JP | 2002-227845 | 8/2002 |
| JP | 2003-148485 | 5/2003 |
| JP | 2003-183771 | 7/2003 |
| JP | 2004-190127 | 7/2004 |
| JP | 2005-504879 | 2/2005 |
| JP | 2005-098396 | 4/2005 |
| JP | 2006-038167 | 2/2006 |
| JP | 2006-083965 | 3/2006 |
| JP | 2006-183845 | 7/2006 |
| JP | 2007-078026 | 3/2007 |
| JP | 2007-085446 | 4/2007 |
| JP | 2007-120712 A | 5/2007 |
| JP | 2007-177842 | 7/2007 |
| JP | 2008-008396 | 1/2008 |
| JP | 2008-008419 | 1/2008 |
| WO | WO 99/58865 | 11/1999 |
| WO | WO 2009-069547 | 6/2009 |

OTHER PUBLICATIONS

Letter from Jessica Avery, Corporate Counsel at NHBB, New Hampshire Ball Bearings, Inc., A Minebea Company, dated Jan. 11, 2012.
Japanese Office Action, and English translation thereof, issued in Japanese Patent Application No. 2008-083856 dated Feb. 28, 2012.
Japanese Decision to Grant Patent, and English translation thereof, issued in Japanese Patent Application No. 2008-083856 dated Oct. 30, 2012.

* cited by examiner

ROLLING BEARING

BACKGROUND OF THE INVENTION

1. Field of the Invention

The present invention relates to a rolling bearing, and more specifically, it relates to a rolling bearing suppressing occurrence of seizure.

2. Description of the Background Art

Following the recent improvement in performance and efficiency of a mechanical device employing a rolling bearing, high durability in a severe environment tends to be required to the rolling bearing. More specifically, a rolling bearing employed in a contaminated environment penetrated by hard foreign matter may be damaged in an early stage (in an operating time shorter than a calculated life of the bearing) due to gripping of the foreign matter. On the other hand, a rolling bearing used in an insufficiently lubricated environment may cause seizure. Such seizure is easily caused particularly between a cage constituting the rolling bearing and a race member such as an inner ring or an outer ring guiding the cage. When the rolling bearing is used in a high-temperature environment of a temperature exceeding 200° C., for example, hardness of components such as the race member and rolling elements constituting the rolling bearing may be reduced, to reduce the durability of the rolling bearing.

When the components such as the race member and the rolling elements are made of steel, strength at a high temperature can be improved for improving the durability of the rolling bearing in the high-temperature environment by adding at least 3.75 mass % of chromium to the steel thereby improving tempering softening resistance of the steel. In order to improve the durability in the contaminated environment, a treatment of forming nitrogen-enriched layers having higher nitrogen concentrations than the remaining regions on surface layer portions of the components such as the race member and the rolling elements by performing nitriding, for example, can be employed.

In components made of steel having a high chromium content of at least 3.75 mass %, for example, chemically stable oxide films are formed on the surface layer portions. When ordinary nitriding is performed on these components, therefore, nitrogen does not penetrate into the surface layer portions thereof, and no nitrogen-enriched layers are formed. In relation to this, there is proposed a countermeasure of forming nitrogen-enriched layers by performing plasma nitriding (refer to Japanese Patent Laying-Open No. 2-57675 (1990: Patent Document 1), for example). As to control of the plasma nitriding, there are proposed a method based on spectral analysis of glow discharge and a method based on the density of a current flowing in treated objects (refer to Japanese Patent Laying-Open No. 7-118826 (1995: Patent Document 2) and Japanese Patent Laying-Open No. 9-3646 (1997: Patent Document 3), for example). Thus, nitrogen-enriched layers can be formed on the surface layer portions of the components such as the race member and the rolling elements made of the steel containing at least 3.75 mass % of chromium.

In order to improve seizure resistance, there is proposed a countermeasure of dipping balls serving as the rolling elements in an organic phosphorus compound for forming reaction layers on the surfaces thereof (refer to Japanese Patent Laying-Open No. 9-133130 (1997: Patent Document 4), for example).

Even if the nitrogen-enriched layers are formed on the surface layer portions of the components such as the race member and the rolling elements made of the steel containing at least 3.75 mass % of chromium by the aforementioned plasma nitriding, however, the characteristics of the components may not be sufficiently improved. In other words, separation or fracture may be caused in an early stage when stress is repetitively applied to the aforementioned components (reduction in fatigue strength). Further, breakage may be easily caused when impactive stress is applied to the aforementioned components (reduction in toughness). Thus, sufficient characteristics may not necessarily be attained particularly in fatigue strength and toughness when merely nitrogen-enriched layers are formed on the components such as the race member and the rolling elements made of the steel containing at least 3.75 mass % of chromium, although the surface layer portions thereof are improved in hardness.

The environment in which the rolling bearing is used is becoming increasingly severe. To a rolling bearing used for a jet engine of an aircraft or the like, for example, not only suppression of reduction in hardness of components in a high-temperature environment and improvement in durability in a contaminated environment but also improvement of seizure resistance in a case where lubrication is temporarily stopped (improvement of the so-called dry-run performance) are required. In order to improve the dry-run performance, seizure between a race member and a cage must be efficiently suppressed, in particular. Therefore, conventional countermeasures including those disclosed in the aforementioned Patent Documents 1 to 4 cannot necessarily be regarded as sufficient.

SUMMARY OF THE INVENTION

Accordingly, an object of the present invention is to provide a rolling bearing capable of attaining not only suppression of reduction in hardness of components in a high-temperature environment and improvement in durability in a contaminated environment but also improvement of dry-run performance.

A rolling bearing according to a first aspect of the present invention includes a race member constituted of steel containing at least 0.77 mass % and not more than 0.85 mass % of carbon, at least 0.01 mass % and not more than 0.25 mass % of silicon, at least 0.01 mass % and not more than 0.35 mass % of manganese, at least 0.01 mass % and not more than 0.15 mass % of nickel, at least 3.75 mass % and not more than 4.25 mass % of chromium, at least 4 mass % and not more than 4.5 mass % of molybdenum and at least 0.9 mass % and not more than 1.1 mass % of vanadium with the rest consisting of iron and impurities and provided with a nitrogen-enriched layer having a nitrogen concentration of at least 0.05 mass % formed on a region including a surface so that the total of a carbon concentration and the nitrogen concentration in the nitrogen-enriched layer is at least 0.82 mass % and not more than 1.9 mass %, a plurality of rolling elements, in contact with the race member, arranged on an annular race and a cage retaining the rolling elements on the race. The race member includes a race member contact surface in contact with the cage. On the other hand, the cage includes a cage contact surface in contact with the race member. An anti-seizure layer made of a material different from the material constituting the race member is arranged on a region including at least either the race member contact surface or the cage contact surface.

The inventor has conducted detailed studies as to the reason why fatigue strength and toughness are reduced when a nitrogen-enriched layer is formed on a component such as a race member or any rolling element made of steel containing at least 3.75 mass % of chromium. As a result, it has been recognized that the fatigue strength and the toughness of the component are reduced due to the following phenomenon:

When the nitrogen-enriched layer is formed on the component made of steel containing at least 3.75 mass % of chromium by plasma nitriding as hereinabove described, the quantity of nitrogen on the surface layer portion exceeds the solubility limit (solubility limit including nitrogen contained in a deposit) of the steel constituting the component. Therefore, nitrides of iron ($Fe_3N$, $Fe_4N$ etc.) deposited along grain boundaries are formed in the steel constituting the component. Nitrides of iron each having an aspect ratio of at least 2 and a length of 7.5 μm (nitrides of iron each having an aspect ratio of at least 2 and a length of 7.5 μm formed along grain boundaries are hereinafter referred to as grain boundary deposits) may serve as starting points of separation and fracture.

More specifically, when stress is repetitively applied to a component having a grain boundary deposit formed therein, the stress may be concentrated on this grain boundary deposit, to cause cracking. This cracking progresses to result in separation or fracture, leading to reduction in fatigue strength of the component. When impactive stress is applied to the component having the grain boundary deposit formed therein, the grain boundary deposit promotes formation or progress of cracking, and hence toughness may be reduced. In other words, an excess quantity of nitrogen penetrates into the surface layer portion of the component such as the race member or the rolling element to form the grain boundary deposit, and the fatigue strength or toughness of the component can be reduced due to this grain boundary deposit.

In the race member constituting the rolling bearing according to the first aspect of the present invention, on the other hand, the nitrogen-enriched layer having the nitrogen concentration of at least 0.05 mass % is formed on the region including the surface of the race member made of the steel having the proper component composition and the total of the carbon concentration and the nitrogen concentration in the nitrogen-enriched layer is set in the proper range, whereby formation of grain boundary deposits can be suppressed. As a result, a race member made of steel containing at least 3.75 mass % of chromium for suppressing reduction in hardness in a high-temperature environment and provided with a nitrogen-enriched layer on a surface layer portion thereof while sufficiently ensuring fatigue strength and toughness can be provided according to the first aspect of the present invention. The reasons why the components of the steel constituting the race member and the concentrations of nitrogen and carbon in the nitrogen-enriched layer are limited in the aforementioned ranges are now described.

Carbon Content: at least 0.77 mass % and not more than 0.85 mass %

If the carbon content is less than 0.77 mass % in the steel constituting the race member, there can arise such a problem that sufficient matrix hardness cannot be attained. If the carbon content exceeds 0.85 mass %, on the other hand, there can arise such a problem that a coarse carbide (cementite: $Fe_3C$) is formed. Therefore, the carbon content must be set to at least 0.77 mass % and not more than 0.85 mass %.

Silicon Content: at least 0.01 mass % and not more than 0.25 mass %

If the silicon content is less than 0.01 mass % in the steel constituting the race member, there can arise such a problem that the manufacturing cost for the steel is increased. If the silicon content exceeds 0.25 mass %, on the other hand, there can arise such problems that hardness of the material is increased and cold workability is reduced. Therefore, the silicon content must be set to at least 0.01 mass % and not more than 0.25 mass %.

Manganese Content: at least 0.01 mass % and not more than 0.35 mass %

If the manganese content is less than 0.01 mass % in the steel constituting the race member, there can arise such a problem that the manufacturing cost for the steel is increased. If the manganese content exceeds 0.35 mass %, on the other hand, there can arise such problems that the hardness of the material is increased and the cold workability is reduced. Therefore, the manganese content must be set to at least 0.01 mass % and not more than 0.35 mass %.

Nickel Content: at least 0.01 mass % and not more than 0.15 mass %

If the nickel content is less than 0.01 mass % in the steel constituting the race member, there can arise such a problem that the manufacturing cost for the steel is increased. If the nickel content exceeds 0.15 mass %, on the other hand, there can arise such a problem that the quantity of retained austenite is increased. Therefore, the nickel content must be set to at least 0.01 mass % and not more than 0.15 mass %.

Chromium Content: at least 3.75 mass % and not more than 4.25 mass %

If the chromium content is less than 3.75 mass % in the steel constituting the race member, there can arise such a problem that tempering softening resistance is reduced. If the chromium content exceeds 4.25 mass %, on the other hand, there can arise such a problem that solid solution of a carbide is inhibited when quenching is performed. Therefore, the chromium content must be set to at least 3.75 mass % and not more than 4.25 mass %.

Molybdenum Content: at least 4 mass % and not more than 4.5 mass %

If the molybdenum content is less than 4 mass % in the steel constituting the race member, there can arise such a problem that the tempering softening resistance is reduced. If the molybdenum content exceeds 4.5 mass %, on the other hand, there can arise such a problem that the manufacturing cost for the steel is increased. Therefore, the molybdenum content must be set to at least 4 mass % and not more than 4.5 mass %.

Vanadium Content: at least 0.9 mass % and not more than 1.1 mass %

If the vanadium content is less than 0.9 mass % in the steel constituting the race member, there can arise such problems that the tempering softening resistance is reduced and an effect of refinement of the structure resulting from addition of vanadium is reduced. If the vanadium content exceeds 1.1 mass %, on the other hand, there can arise such a problem that the manufacturing cost for the steel is increased. Therefore, the vanadium content must be set to at least 0.9 mass % and not more than 1.1 mass %.

Nitrogen Concentration in Nitrogen-Enriched Layer: at least 0.05 mass %

In order to supply sufficient hardness to the surface layer portion for ensuring wear resistance etc. in the race member made of the aforementioned steel, the nitrogen-enriched layer having the nitrogen concentration of at least 0.05 mass % must be formed on the region including the surface. In order to further improve the wear resistance etc., the nitrogen concentration in the surface of the race member is preferably at least 0.15 mass %.

Total of Nitrogen Concentration and Carbon Concentration in Nitrogen-Enriched Layer: at least 0.82 mass % and not more than 1.9 mass %

In order to supply sufficient hardness to the surface layer portion for ensuring the wear resistance etc. in the race member made of the aforementioned steel, it is important to control not only the nitrogen concentration but also the carbon concentration. The inventor has found that it is difficult to supply sufficient hardness to the surface layer portion for ensuring the wear resistance etc. if the total of the nitrogen concentration and the carbon concentration in the nitrogen-enriched layer is less than 0.82 mass %. Therefore, the total of the nitrogen concentration and the carbon concentration in the nitrogen-enriched layer must be set to at least 0.82 mass %. In order to easily supply sufficient hardness to the surface layer portion for ensuring the wear resistance etc., the total of the nitrogen concentration and the carbon concentration in the nitrogen-enriched layer is preferably set to at least 0.97 mass %.

On the other hand, grain boundary deposits are easily formed if the nitrogen concentration in the surface layer portion is increased in the race member made of the aforementioned steel, and this tendency is further strengthened if the carbon concentration is increased. The inventor has found that it is difficult to suppress formation of grain boundary deposits if the total of the nitrogen concentration and the carbon concentration in the nitrogen-enriched layer exceeds 1.9 mass %. Therefore, the total of the nitrogen concentration and the carbon concentration in the nitrogen-enriched layer must be set to not more than 1.9 mass %. In order to further suppress formation of grain boundary deposits, the total of the nitrogen concentration and the carbon concentration in the nitrogen-enriched layer is preferably set to not more than 1.7 mass %. The carbon concentration and the nitrogen concentration denote concentrations in the matrix (mother phase) which is a region other than carbides of iron, chromium etc.

In the rolling bearing according to the first aspect of the present invention, the anti-seizure layer made of the material different from the material constituting the race member is arranged on the region including at least either the race member contact surface or the cage contact surface. In order to improve seizure resistance, particularly dry-run performance of the rolling bearing, seizure between the race member and the cage must be effectively suppressed, as hereinabove described. On the other hand, the race member of the rolling bearing according to the first aspect of the present invention is made of steel, and the cage is generally also made of a metallic material such as steel. When the race member and the cage are made of the same types of materials, seizure tends to be easily caused in an insufficiently lubricated environment. However, the seizure resistance, particularly the dry-run performance of the rolling bearing can be improved by arranging the anti-seizure layer made of the material different from the material constituting the race member on the region including at least either the race member contact surface or the cage contact surface. When the nitrogen-enriched layer is formed not only on a region (rolling surface) of the surface of the race member coming into contact with the rolling elements but also on the race member contact surface in a process of manufacturing the race member, seizure may be easily caused between the race member and the cage. In order to avoid formation of the nitrogen-enriched layer on the race member contact surface in nitriding for forming the nitrogen-enriched layer, a complicated process of forming a film or the like for preventing nitriding on the race member contact surface before the nitriding, then performing the nitriding and thereafter removing the film is required. In the rolling bearing according to the first aspect of the present invention premised on formation of the nitrogen-enriched layer on the race member, therefore, the anti-seizure layer is so formed that the aforementioned complicated process in the manufacturing process can be avoided.

In the rolling bearing according to the first aspect of the present invention, as hereinabove described, the race member is made of the steel containing at least 3.75 mass % of chromium, whereby reduction in hardness of the components in a high-temperature environment is suppressed. Further, the nitrogen-enriched layer having the total of the carbon concentration and the nitrogen concentration set in the proper range is formed on the surface layer portion of the race member made of the steel having the proper component composition, whereby the durability of the components in a contaminated environment is improved. In addition, the anti-seizure layer is arranged on the region including at least either the race member contact surface or the cage contact surface, whereby the seizure resistance, particularly the dry-run performance is improved. Consequently, a rolling bearing capable of attaining not only suppression of reduction in hardness of the components in a high-temperature environment and improvement in durability in a contaminated environment but also improvement of the dry-run performance can be provided according to the first aspect of the present invention.

As the material constituting the anti-seizure layer, DLC (diamond-like carbon), ceramics such as alumina, silicon nitride, silicon carbide or zirconia, polyimide resin, fluororesin such as PTFE (polytetrafluoroethylene), PFA (perfluoroalkoxyl alkane), FEP (fluorinated ethylene propylene copolymer), ETFE (ethylene tratrafluoroethylene) or PVdF (polyvinylidene fluoride) or resin such as PEEK (polyether ether ketone), PPS (polyphenylene sulfide) or phenol resin usable at a temperature of at least 200° C. can be employed.

In the rolling bearing according to the aforementioned first aspect, the anti-seizure layer can be made of DLC. DLC having high hardness and a smaller coefficient of dynamic friction than steel is preferable as the material constituting the anti-seizure layer.

In the rolling bearing according to the aforementioned first aspect, the anti-seizure layer can be made of resin having a low coefficient of dynamic friction. Resin having a low coefficient of dynamic friction such as polyimide resin, fluororesin such as PTFE, PFA, FEP, ETFE or PVdF, PEEK, PPS or phenol resin has a smaller coefficient of dynamic friction than steel and suppresses occurrence of seizure by being worn when insufficiently lubricated, and hence is preferable as the material constituting the anti-seizure layer.

Preferably in the rolling bearing according to the aforementioned first aspect, the resin having a low coefficient of dynamic friction has a porous structure to be impregnable with a lubricant. Thus, the resin having a low coefficient of dynamic friction is impregnated with the lubricant in operation of the bearing, so that the lubricant ensures lubrication and suppresses occurrence of seizure even if lubrication is insufficient. As the resin having a low coefficient of dynamic friction and a porous structure, phenol resin or the like can be employed.

Preferably in the rolling bearing according to the aforementioned first aspect, the thickness of the aforementioned nitrogen-enriched layer is at least 0.05 mm. In the race member, strength of the surface and a portion immediately under the surface, more specifically a region within 0.05 mm in distance from the surface may generally be important. Therefore, the thickness of the aforementioned nitrogen-enriched layer is so set to at least 0.05 mm that sufficient strength can be supplied to the race member. In order to render the strength of the race member more sufficient, the thickness of the aforementioned nitrogen-enriched layer is preferably at least 0.10 mm.

Preferably in the rolling bearing according to the aforementioned first aspect, the aforementioned nitrogen-enriched layer has hardness of at least 830 HV. The hardness of the nitrogen-enriched layer formed on the surface layer portion is so set to at least 830 HV that the strength of the race member can be more reliably ensured.

Preferably in the rolling bearing according to the aforementioned first aspect, the number of nitrides of iron each having an aspect ratio of at least 2 and a length of 7.5 μm is not more than one in five fields of square regions of 150 μm on each side when the aforementioned nitrogen-enriched layer is observed with a microscope.

As hereinabove described, grain boundary deposits each having an aspect ratio of at least 2 and a length of 7.5 μm may reduce characteristics such as the fatigue strength and the toughness of the components. The inventor has investigated the relation between the fatigue strength and the number density of grain boundary deposits as to a component made of steel having the aforementioned component composition, to find that the fatigue strength of the component is reduced if the grain boundary deposits are present in a number density exceeding one in five fields of square regions of 150 μm on each side when the aforementioned nitrogen-enriched layer is observed with a microscope. If the number of grain boundary deposits is not more than one in five fields of square regions of 150 μm on each side when the nitrogen-enriched layer is observed with a microscope, therefore, the fatigue strength of the race member can be improved. In order to further improve the fatigue strength of the race member, the number of the aforementioned grain boundary deposits is preferably not more than one in 60 fields of square regions of 150 μm on each side.

Preferably in the rolling bearing according to the aforementioned first aspect, the rolling elements are made of ceramics. Thus, the race member and the rolling elements coming into contact with each other are made of different materials, whereby the seizure resistance is improved. Further, ceramics harder than steel is so employed as the material for the rolling elements that the durability of the rolling elements in a contaminated environment is improved. In addition, the rolling elements are so made of ceramics that reduction in hardness of the rolling elements in a high-temperature environment is suppressed. As the ceramics constituting the rolling elements, silicon nitride, sialon, alumina or zirconia, for example, can be employed.

In the rolling bearing according to the aforementioned first aspect, the rolling elements may be made of steel having the aforementioned component composition, similarly to the race member. In this case, nitrogen-enriched layers similar in structure to the aforementioned race member are preferably formed on the rolling elements.

The rolling bearing according to the aforementioned first aspect may be employed as a bearing supporting a rotating member which is a main shaft or a member rotating upon rotation of the main shaft to be rotatable with respect to a member adjacent to the rotating member in a gas turbine engine. To such a bearing supporting the rotating member (the main shaft or the member rotating upon rotation of the main shaft) in the gas turbine engine, suppression of reduction in hardness of components in a high temperature environment, improvement of durability in a contaminated environment and improvement of dry-run performance are required. Therefore, the rolling bearing according to the first aspect of the present invention capable of attaining not only suppression of reduction in hardness of components in a high-temperature environment and improvement in durability in a contaminated environment but also improvement of dry-run performance is preferable as a bearing supporting a rotating member in a gas turbine engine.

The concentrations of nitrogen and carbon in the aforementioned nitrogen-enriched layer can be investigated by EPMA (electron probe microanalysis), for example. The number density of the aforementioned nitrides of iron (grain boundary deposits) can be investigated as follows, for example: First, the component is cut along a section perpendicular to the surface thereof, and this section is polished. Then, the section is etched with a proper etchant, and the nitrogen-enriched layer is thereafter observed with an SEM (scanning electron microscope) or an optical microscope and photographed. A square field of 150 μm on each side and one side is defined as the surface are analyzed with an image analyzer, for investigating the number of grain boundary deposits. This analysis is randomly performed in at least five fields, for calculating the number of grain boundary deposits in five fields.

A rolling bearing according to a second aspect of the present invention includes a race member constituted of steel containing at least 0.11 mass % and not more than 0.15 mass % of carbon, at least 0.1 mass % and not more than 0.25 mass % of silicon, at least 0.15 mass % and not more than 0.35 mass % of manganese, at least 3.2 mass % and not more than 3.6 mass % of nickel, at least 4 mass % and not more than 4.25 mass % of chromium, at least 4 mass % and not more than 4.5 mass % of molybdenum and at least 1.13 mass % and not more than 1.33 mass % of vanadium with the rest consisting of iron and impurities and provided with a nitrogen-enriched layer having a nitrogen concentration of at least 0.05 mass % formed on a region including a surface so that the total of a carbon concentration and the nitrogen concentration in the nitrogen-enriched layer is at least 0.55 mass % and not more than 1.9 mass %, a plurality of rolling elements, in contact with the race member, arranged on an annular race and a cage retaining the rolling elements on the race. The race member includes a race member contact surface in contact with the cage. On the other hand, the cage includes a cage contact surface in contact with the race member. An anti-seizure layer made of a material different from the material constituting the race member is arranged on a region including at least either the race member contact surface or the cage contact surface.

The inventor has conducted detailed studies as to the reason why fatigue strength and toughness are reduced when a nitrogen-enriched layer is formed on a bearing component made of steel containing at least 4 mass % of chromium. As a result, it has been recognized that the fatigue strength and the toughness of the component are reduced due to the following phenomenon:

When the nitrogen-enriched layer is formed on the bearing component made of steel containing at least 4 mass % of chromium by plasma nitriding as hereinabove described, the quantity of nitrogen on the surface layer portion exceeds the solubility limit (solubility limit including nitrogen contained in a deposit) of the steel constituting the component. Therefore, nitrides of iron ($Fe_3N$, $Fe_4N$ etc.) deposited along grain boundaries are formed in the steel constituting the component. Nitrides of iron each having an aspect ratio of at least 2 and a length of 7.5 μm (nitrides of iron each having an aspect ratio of at least 2 and a length of 7.5 μm formed along grain boundaries are hereinafter referred to as grain boundary deposits) may serve as starting points of separation and fracture.

More specifically, when stress is repetitively applied to a component having a grain boundary deposit formed therein, the stress may be concentrated on this grain boundary deposit, to cause cracking. This cracking progresses to result in separation or fracture, leading to reduction in fatigue strength of the component. When impactive stress is applied to the component having the grain boundary deposit formed therein, the grain boundary deposit promotes formation or progress of cracking, and hence toughness may be reduced. In other words, an excess quantity of nitrogen penetrates into the surface layer portion of the component such as the race member or any rolling element to form the grain boundary deposit, and the fatigue strength or toughness of the component can be reduced due to this grain boundary deposit.

In the race member constituting the rolling bearing according to the second aspect of the present invention, on the other hand, the nitrogen-enriched layer having the nitrogen concentration of at least 0.05 mass % is formed on the region including the surface of the race member made of the steel having the proper component composition and the total of the carbon concentration and the nitrogen concentration in the nitrogen-enriched layer is set in the proper range, whereby formation of grain boundary deposits can be suppressed. As a result, a race member made of steel containing at least 4 mass % of chromium for suppressing reduction in hardness in a high-temperature environment and provided with a nitrogen-enriched layer on a surface layer portion while sufficiently ensuring fatigue strength and toughness can be provided according to the second aspect of the present invention. The reasons why the components of the steel constituting the race member and the concentrations of nitrogen and carbon in the nitrogen-enriched layer are limited in the aforementioned ranges are now described.

Carbon Content: at least 0.11 mass % and not more than 0.15 mass %

If the carbon content is less than 0.11 mass % in the steel constituting the race member, there can arise such a problem that the manufacturing cost for the steel is increased. If the carbon content exceeds 0.15 mass %, on the other hand, there can arise such problems that core hardness is increased and toughness is reduced. Therefore, the carbon content must be set to at least 0.11 mass % and not more than 0.15 mass %.

Silicon Content: at least 0.1 mass % and not more than 0.25 mass %

If the silicon content is less than 0.1 mass % in the steel constituting the race member, there can arise such a problem that the manufacturing cost for the steel is increased. If the silicon content exceeds 0.25 mass %, on the other hand, there can arise such problems that hardness of the material is increased and cold workability is reduced. Therefore, the silicon content must be set to at least 0.1 mass % and not more than 0.25 mass %.

Manganese Content: at least 0.15 mass % and not more than 0.35 mass %

If the manganese content is less than 0.15 mass % in the steel constituting the race member, there can arise such a problem that the manufacturing cost for the steel is increased. If the manganese content exceeds 0.35 mass %, on the other hand, there can arise such problems that the hardness of the material is increased and the cold workability is reduced. Therefore, the manganese content must be set to at least 0.15 mass % and not more than 0.35 mass %.

Nickel Content: at least 3.2 mass % and not more than 3.6 mass %

If the nickel content is less than 3.2 mass % in the steel constituting the race member, there can arise such a problem that effects of improving corrosion resistance, hardness and toughness are reduced. If the nickel content exceeds 3.6 mass %, on the other hand, there can arise such a problem that the quantity of retained austenite is increased. Therefore, the nickel content must be set to at least 3.2 mass % and not more than 3.6 mass %.

Chromium Content: at least 4 mass % and not more than 4.25 mass %

If the chromium content is less than 4 mass % in the steel constituting the race member, there can arise such a problem that tempering softening resistance is reduced. If the chromium content exceeds 4.25 mass %, on the other hand, there can arise such a problem that solid solution of a carbide is inhibited when quenching is performed. Therefore, the chromium content must be set to at least 4 mass % and not more than 4.25 mass %.

Molybdenum Content: at least 4 mass % and not more than 4.5 mass %

If the molybdenum content is less than 4 mass % in the steel constituting the race member, there can arise such a problem that the tempering softening resistance is reduced. If the molybdenum content exceeds 4.5 mass %, on the other hand, there can arise such a problem that the manufacturing cost for the steel is increased. Therefore, the molybdenum content must be set to at least 4 mass % and not more than 4.5 mass %.

Vanadium Content: at least 1.13 mass % and not more than 1.33 mass %

If the vanadium content is less than 1.13 mass % in the steel constituting the race member, there can arise such problems that the tempering softening resistance is reduced and an effect of refinement of a microstructure resulting from addition of vanadium is reduced. If the vanadium content exceeds 1.33 mass %, on the other hand, there can arise such a problem that the manufacturing cost for the steel is increased. Therefore, the vanadium content must be set to at least 1.13 mass % and not more than 1.33 mass %.

Nitrogen Concentration in Nitrogen-Enriched Layer: at least 0.05 mass %

In order to supply sufficient hardness to the surface layer portion for ensuring wear resistance etc. in the race member made of the aforementioned steel, the nitrogen-enriched layer having the nitrogen concentration of at least 0.05 mass % must be formed on the region including the surface. In order to further improve the wear resistance etc., the nitrogen concentration in the surface of the race member is preferably at least 0.15 mass %.

Total of Nitrogen Concentration and Carbon Concentration in Nitrogen-Enriched Layer: at least 0.55 mass % and not more than 1.9 mass %

In order to supply sufficient hardness to the surface layer portion for ensuring the wear resistance etc. in the race member made of the aforementioned steel, it is important to control not only the nitrogen concentration but also the carbon concentration. The inventor has found that it is difficult to supply sufficient hardness to the surface layer portion for ensuring the wear resistance etc. if the total of the nitrogen concentration and the carbon concentration in the nitrogen-enriched layer is less than 0.55 mass %. Therefore, the total of the nitrogen concentration and the carbon concentration in the nitrogen-enriched layer must be set to at least 0.55 mass %. In order to easily supply sufficient hardness to the surface layer portion for ensuring the wear resistance etc., the total of the nitrogen concentration and the carbon concentration in the nitrogen-enriched layer is preferably set to at least 0.7 mass %.

On the other hand, grain boundary deposits are easily formed if the nitrogen concentration in the surface layer portion is increased in the race member made of the aforementioned steel, and this tendency is further strengthened if the carbon concentration is increased. The inventor has found that it is difficult to suppress formation of grain boundary deposits if the total of the nitrogen concentration and the carbon concentration in the nitrogen-enriched layer exceeds 1.9 mass %. Therefore, the total of the nitrogen concentration and the carbon concentration in the nitrogen-enriched layer must be set to not more than 1.9 mass %. In order to further suppress formation of grain boundary deposits, the total of the nitrogen concentration and the carbon concentration in the nitrogen-enriched layer is preferably set to not more than 1.7 mass %. The carbon concentration and the nitrogen concentration denote concentrations in the matrix (mother phase) which is a region other than carbides of iron, chromium etc.

In the rolling bearing according to the second aspect of the present invention, the anti-seizure layer made of the material different from the material constituting the race member is arranged on the region including at least either the race member contact surface or the cage contact surface. In order to improve seizure resistance, particularly dry-run performance of the rolling bearing, seizure between the race member and the cage must be effectively suppressed, as hereinabove described. On the other hand, the race member of the rolling bearing according to the second aspect of the present invention is made of steel, and the cage is generally also made of a metallic material such as steel. When the race member and the cage are made of the same types of materials, seizure tends to be easily caused in an insufficiently lubricated environment. However, the seizure resistance, particularly the dry-run performance of the rolling bearing can be improved by arranging the anti-seizure layer made of the material different from the material constituting the race member on the region including at least either the race member contact surface or the cage contact surface. When the nitrogen-enriched layer is formed not only on a region (rolling surface) of the surface of the race member coming into contact with the rolling elements but also on the race member contact surface in a process of manufacturing the race member, seizure may be easily caused between the race member and the cage. In order to avoid formation of the nitrogen-enriched layer on the race member contact surface in nitriding for forming the nitrogen-enriched layer, a complicated process of forming a film or the like for preventing nitriding on the race member contact surface before the nitriding, then performing the nitriding and thereafter removing the film is required. In the rolling bearing according to the second aspect of the present invention premised on formation of the nitrogen-enriched layer on the race member, therefore, the aforementioned complicated process in the manufacturing process can be avoided by forming the anti-seizure layer.

In the rolling bearing according to the second aspect of the present invention, as hereinabove described, the race member is made of the steel containing at least 4 mass % of chromium, whereby reduction in hardness of the components in a high-temperature environment is suppressed. Further, the nitrogen-enriched layer having the total of the carbon concentration and the nitrogen concentration set in the proper range is formed on the surface layer portion of the race member made of the steel having the proper component composition, whereby durability of the components in a contaminated environment is improved. In addition, the anti-seizure layer is arranged on the region including at least either the race member contact surface or the cage contact surface, whereby the seizure resistance, particularly the dry-run performance is improved. Consequently, a rolling bearing capable of attaining not only suppression of reduction in hardness of the components in a high-temperature environment and improvement in durability in a contaminated environment but also improvement of the dry-run performance can be provided according to the second aspect of the present invention.

As the material constituting the anti-seizure layer, DLC, ceramics such as alumina, silicon nitride, silicon carbide or zirconia, polyimide resin, fluororesin such as PTFE, PFA, FEP, ETFE or PVdF, PEEK, PPS or phenol resin can be employed.

In the rolling bearing according to the aforementioned second aspect, the anti-seizure layer can be made of DLC. DLC having high hardness and a smaller coefficient of dynamic friction than steel is preferable as the material constituting the anti-seizure layer.

In the rolling bearing according to the aforementioned second aspect, the anti-seizure layer can be made of resin having a low coefficient of dynamic friction. Resin having a low coefficient of dynamic friction such as polyimide resin, fluororesin such as PTFE, PFA, FEP, ETFE or PVdF, PEEK, PPS or phenol resin has a smaller coefficient of dynamic friction than steel and suppresses occurrence of seizure by being worn when insufficiently lubricated, and hence is preferable as the material constituting the anti-seizure layer.

Preferably in the rolling bearing according to the aforementioned second aspect, the resin having a low coefficient of dynamic friction has a porous structure to be impregnable with a lubricant. Thus, the resin having a low coefficient of dynamic friction is impregnated with the lubricant in operation of the bearing, so that the lubricant ensures lubrication and suppresses occurrence of seizure even if lubrication is insufficient. As the resin having a low coefficient of dynamic friction and a porous structure, phenol resin or the like can be employed.

Preferably in the rolling bearing according to the aforementioned second aspect, the thickness of the aforementioned nitrogen-enriched layer is at least 0.05 mm. In the race member, strength of the surface and a portion immediately under the surface, more specifically a region within 0.05 mm in distance from the surface may generally be important. Therefore, the thickness of the aforementioned nitrogen-enriched layer is so set to at least 0.05 mm that sufficient strength can be supplied to the race member. In order to render the strength of the race member more sufficient, the thickness of the aforementioned nitrogen-enriched layer is preferably at least 0.10 mm.

Preferably in the rolling bearing according to the aforementioned second aspect, the aforementioned nitrogen-enriched layer has hardness of at least 800 HV. The hardness of the nitrogen-enriched layer formed on the surface layer portion is so set to at least 800 HV that the strength of the race member can be more reliably ensured.

Preferably in the rolling bearing according to the aforementioned second aspect, the number of nitrides of iron each having an aspect ratio of at least 2 and a length of 7.5 μm is not more than one in five fields of square regions of 150 μm on each side when the aforementioned nitrogen-enriched layer is observed with a microscope.

As hereinabove described, grain boundary deposits each having an aspect ratio of at least 2 and a length of 7.5 μm may reduce characteristics such as the fatigue strength and the toughness of the components. The inventor has investigated the relation between the fatigue strength and the number density of grain boundary deposits as to a component made of steel having the aforementioned component composition, to find that the fatigue strength of the component is reduced if the grain boundary deposits are present in a number density exceeding one in five fields of square regions of 150 μm on each side when the aforementioned nitrogen-enriched layer is observed with a microscope. If the number of grain boundary deposits is not more than one in five fields of square regions of 150 μm on each side when the nitrogen-enriched layer is observed with a microscope, therefore, the fatigue strength of the race member can be improved. In order to further improve the fatigue strength of the race member, the number of the aforementioned grain boundary deposits is preferably not more than one in 60 fields of square regions of 150 μm on each side.

Preferably in the rolling bearing according to the aforementioned second aspect, the rolling elements are made of ceramics. Thus, the race member and the rolling elements coming into contact with each other are made of different materials, whereby the seizure resistance is improved. Further, ceramics harder than steel is so employed as the material for the rolling elements that durability of the rolling elements in a contaminated environment is improved. In addition, the rolling elements are so made of ceramics that reduction in hardness of the rolling elements in a high-temperature environment is suppressed. As the ceramics constituting the rolling elements, silicon nitride, sialon, alumina or zirconia, for example, can be employed.

In the rolling bearing according to the aforementioned second aspect, the rolling elements may be made of steel. As the steel constituting the rolling elements, AISI M50 or M50 NiL, for example, can be employed. When the rolling elements are made of M50 NiL, nitrogen-enriched layers similar in structure to the aforementioned race member are preferably formed on the rolling elements. When the rolling elements are made of M50, nitrogen-enriched layers basically similar in structure to the aforementioned race member with carbon and nitrogen concentrations set to at least 0.82 mass % and not more than 1.9 mass % in total are preferably formed on the rolling elements.

The rolling bearing according to the aforementioned second aspect may be employed as a bearing supporting a rotating member which is a main shaft or a member rotating upon rotation of the main shaft to be rotatable with respect to a member adjacent to the rotating member in a gas turbine engine. To such a bearing supporting the rotating member (the main shaft or the member rotating upon rotation of the main shaft) in the gas turbine engine, suppression of reduction in hardness of components in a high temperature environment, improvement of durability in a contaminated environment and improvement of dry-run performance are required. Therefore, the rolling bearing according to the second aspect of the present invention capable of attaining not only suppression of reduction in hardness of components in a high-temperature environment and improvement in durability in a contaminated environment but also improvement of dry-run performance is preferable as a bearing supporting a rotating member in a gas turbine engine.

The concentrations of nitrogen and carbon in the aforementioned nitrogen-enriched layer can be investigated by EPMA, for example. The number density of the aforementioned nitrides of iron (grain boundary deposits) can be investigated as follows, for example: First, the component is cut along a section perpendicular to the surface thereof, and this section is polished. Then, the section is etched with a proper etchant, and the nitrogen-enriched layer is thereafter observed with an SEM or an optical microscope and photographed. A square field of 150 μm on each side and one side is defined as the surface are analyzed with an image analyzer, for investigating the number of grain boundary deposits. This analysis is randomly performed in at least five fields, for calculating the number of grain boundary deposits in five fields.

As obvious from the above description, a rolling bearing capable of attaining not only suppression of reduction in hardness of components in a high-temperature environment and improvement in durability in a contaminated environment but also improvement of dry-run performance can be provided according to the present invention.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
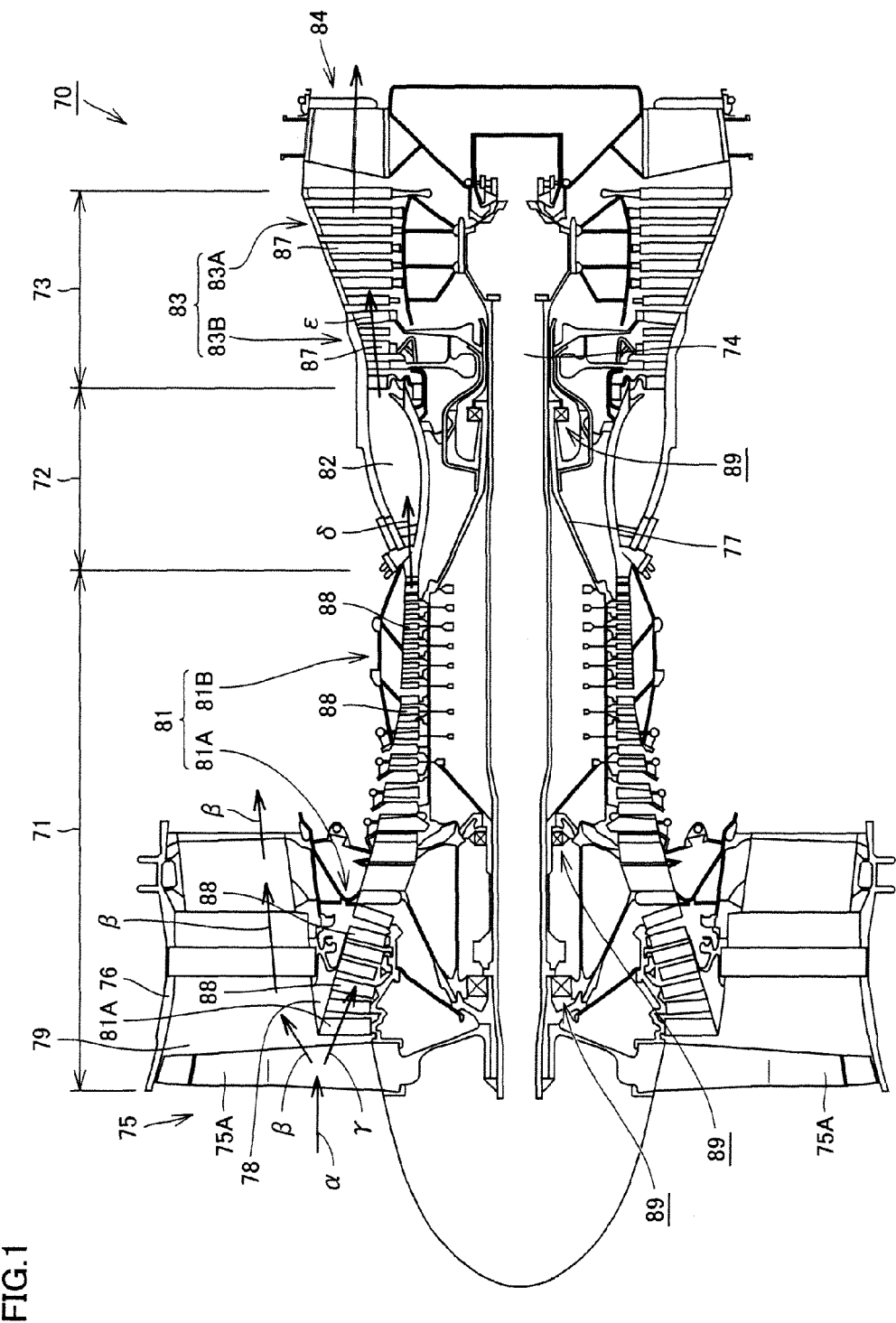
FIG. 1 is a schematic diagram showing the structure of a turbofan engine.

Embodiments of the present invention are now described with reference to the drawings. In the drawings, identical or corresponding portions are denoted by the same reference numerals, and redundant description is not repeated.

First Embodiment

First, the structure of a turbofan engine according to a first embodiment of the present invention is described with reference to FIG. 1.

Referring to FIG. 1, a turbofan engine 70 includes a compression portion 71, a combustion portion 72 and a turbine portion 73. Turbofan engine 70 further includes a low-pressure main shaft 74 so arranged as to reach turbine portion 73 from compression portion 71 through combustion portion 72 and a high-pressure main shaft 77 so arranged as to enclose the outer peripheral surface of low-pressure main shaft 74.

Compression portion 71 includes a fan 75 having a plurality of fan blades 75A connected to low-pressure main shaft 74 and so formed as to radially outwardly protrude from low-pressure main shaft 74, a fan nacelle 76 enclosing the outer peripheral side of fan 75 and extending toward combustion portion 72 and a compressor 81 arranged on the side closer to combustion portion 72 as viewed from fan 75. Compressor 81 has a low-pressure compressor 81A and a high-pressure compressor 81B arranged on the side closer to combustion portion 72 as viewed from low-pressure compressor 81A. Low-pressure compressor 81A has a plurality of compressor blades 88 connected to low-pressure main shaft 74 to radially outwardly protrude from low-pressure main shaft 74 and arranged in line in a direction for approaching combustion portion 72 from the side of fan 75. High-pressure compressor 81B also has a plurality of compressor blades 88 connected to high-pressure main shaft 77 to radially outwardly protrude from high-pressure main shaft 77 and arranged in line in the direction for approaching combustion portion 72 from the side of fan 75. Further, a core cowl 78 is so arranged as to enclose the outer peripheral side of low-pressure compressor 81A. An annular space between core cowl 78 and fan nacelle 76 constitutes a bypass passage 79.

Combustion portion 72 includes a combustion chamber 82 connected to high-pressure compressor 81B of compression portion 71 and provided with a fuel supply member and an ignition member (not shown). Turbine portion 73 includes a turbine 83 having a high-pressure turbine 83B and a low-pressure turbine 83A arranged on a side opposite to combustion portion 72 as viewed from high-pressure turbine 83B. Further, a turbine nozzle 84 discharging combustion gas from turbine 83 is arranged on a side opposite to high-pressure turbine 83B as viewed from low-pressure turbine 83A. Low-pressure turbine 83A has a plurality of turbine blades 87 connected to low-pressure main shaft 74 to radially outwardly protrude from low-pressure main shaft 74 and arranged in line in a direction for approaching turbine nozzle 84 from the side of combustion chamber 82. Low-pressure turbine 83B also has a plurality of turbine blades 87 connected to high-pressure main shaft 77 to radially outwardly protrude from high-pressure main shaft 77 and arranged in line in the direction for approaching turbine nozzle 84 from the side of combustion chamber 82.

Low-pressure main shaft 74 and high-pressure main shaft 77 as rotating members which are main shafts or members rotating upon rotation of the main shafts are supported by rolling bearings 89 to be rotatable with respect to members arranged adjacently to low-pressure main shaft 74 and high-pressure main shaft 77. In other words, each rolling bearing 89 supports low-pressure main shaft 74 or high-pressure main shaft 77 as the rotating member which is the main shaft or the member rotating upon rotation of the main shaft to be rotatable with respect to the member adjacent to low-pressure main shaft 74 or high-pressure main shaft 77.

Operations of turbofan engine 70 according to this embodiment are now described. Referring to FIG. 1, air on the side opposite to combustion portion 72 as viewed from fan 75, i.e., on the front side of turbofan engine 70 is incorporated into the space enclosed with fan nacelle 76 by fan 75 rotating around the axis of low-pressure main shaft 74 (arrow α). Part of the incorporated air flows along arrow β, and is discharged as an air jet through bypass passage 79. This air jet partially forms a thrust generated by turbofan engine 70.

On the other hand, the rest of the air incorporated into the space enclosed with fan nacelle 76 flows into compressor 81 along arrow γ. The air flowing into compressor 81 is compressed by flowing through low-pressure compressor 81A having plurality of compressor blades 88 rotating around the axis of low-pressure main shaft 74, and flows into high-pressure compressor 81B. The air flowing into high-pressure compressor 81B is further compressed by flowing through high-pressure compressor 81B having plurality of compressor blades 88 rotating around the axis of high-pressure main shaft 77, and flows into combustion chamber 82 (arrow δ).

The air compressed in compressor 81 to flow into combustion chamber 82 is mixed with a fuel supplied into combustion chamber 82 by the fuel supply member (not shown), and ignited by the ignition member (not shown). Thus, combustion gas is generated in combustion chamber 82. This combustion gas flows out of combustion chamber 82, to flow into turbine 83 (arrow ε).

The combustion gas flowing into turbine 83 collides with turbine blades 87 connected to high-pressure main shaft 77 in high-pressure turbine 83B, thereby rotating high-pressure main shaft 77 around the axis. Thus, high-pressure compressor 81B having compressor blades 88 connected to high-pressure main shaft 77 is driven. Further, the combustion gas passing through high-pressure turbine 83B collides with turbine blades 87 connected to low-pressure main shaft 74 in low-pressure turbine 83A, thereby rotating low-pressure main shaft 74 around the axis. Thus, low-pressure compressor 81A having compressor blades 88 connected to low-pressure main shaft 74 and fan 75 having fan blades 75A connected to low-pressure main shaft 74 are driven.

The combustion gas passing through low-pressure turbine 83A is discharged from turbine nozzle 84. An air jet of the discharged combustion gas forms a part of the thrust generated by turbofan engine 70.

In turbofan engine 70, rolling bearing 89 supporting low-pressure main shaft 74 or high-pressure main shaft 77 to be rotatable with respect to the member adjacent to low-pressure main shaft 74 or high-pressure main shaft 77 is used in a high-temperature environment due to influence by heat generated in turbofan engine 70. Further, hard foreign matter such as metallic powder or carbon powder may penetrate into rolling bearing 89. Therefore, suppression of reduction in hardness of components in the high-temperature environment and improvement in durability in a contaminated environment are required to rolling bearing 89. Further, dry-run performance is also required to rolling bearing 89 so that, even if lubrication of rolling bearing 89 is temporarily stopped by some cause when turbofan engine 70 is installed in an aircraft, rolling bearing 89 continuously rotatably supports low-pressure main shaft 74 or high-pressure main shaft 77 without seizure until the lubrication is recovered.

When rolling bearing 89 is formed by a rolling bearing according to the first embodiment described below, the aforementioned requirements can be satisfied.

A three-point contact ball bearing as the rolling bearing according to the first embodiment is now described with reference to FIGS. 2 and 3.

Figure 2:
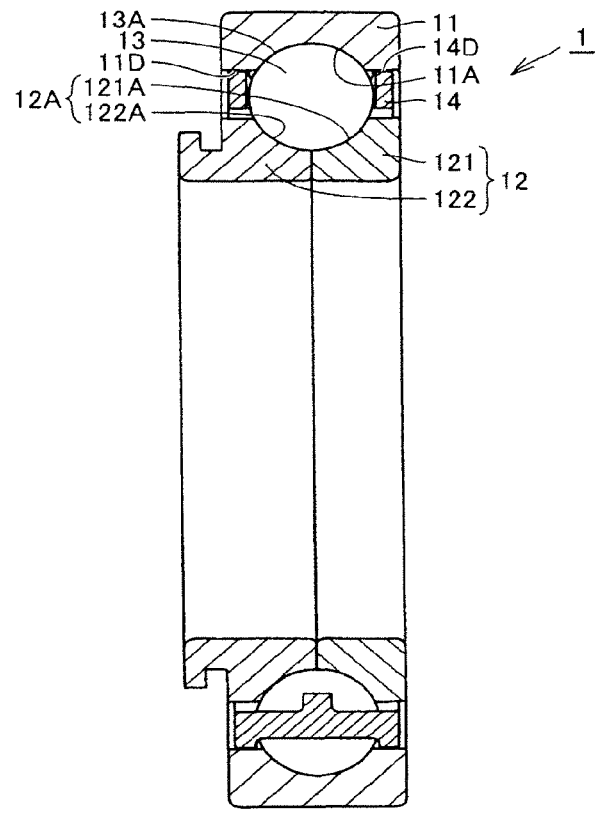
FIG. 2 is a schematic sectional view showing the structure of a three-point contact ball bearing.

Referring to FIG. 2, a three-point contact ball bearing 1 includes an annular outer ring 11 serving as a race member, an annular inner ring 12 serving as a race member arranged inside outer ring 11, and a plurality of balls 13 as rolling elements arranged between outer ring 11 and inner ring 12 and retained in an annular cage 14. An outer ring rolling surface 11A is formed on the inner peripheral surface of outer ring 11, while an inner ring rolling surface 12A is formed on the outer peripheral surface of inner ring 12. Outer ring 11 and inner ring 12 are so arranged that inner ring rolling surface 12A and outer ring rolling surface 11A are opposed to each other. Inner ring 12 includes a first inner ring 121 and a second inner ring 122, and is divided along the axial center. A first inner ring rolling surface 121A and a second inner ring rolling surface 122A are formed on the outer peripheral surfaces of first inner ring 121 and second inner ring 122 respectively. First inner rolling surface 121A and second inner ring rolling surface 122A constitute inner ring rolling surface 12A. Plurality of balls 13 are contactable with first inner ring rolling surface 121A, second inner ring rolling surface 122A and outer ring rolling surface 11A on ball rolling surfaces 13A which are the outer peripheral surfaces thereof, and arranged at a prescribed pitch in the peripheral direction by cage 14, to be retained on an annular race in a rollable manner. Outer ring 11 and inner ring 12 of three-point contact ball bearing 1 are mutually relatively rotatable due to the aforementioned structure.

Outer ring 11 and inner ring 12 serving as the race members are made of steel containing at least 0.77 mass % and not more than 0.85 mass % of carbon, at least 0.01 mass % and not more than 0.25 mass % of silicon, at least 0.01 mass % and not more than 0.35 mass % of manganese, at least 0.01 mass % and not more than 0.15 mass % of nickel, at least 3.75 mass % and not more than 4.25 mass % of chromium, at least 4 mass % and not more than 4.5 mass % of molybdenum and at least 0.9 mass % and not more than 1.1 mass % of vanadium with the rest consisting of iron and impurities. Referring to FIG. 3, an outer ring nitrogen-enriched layer 11B and an inner ring nitrogen-enriched layer 12B having nitrogen concentrations of at least 0.05 mass % are formed on regions including outer ring rolling surface 11A and inner ring rolling surface 12A which are the surfaces of outer ring 11 and inner ring 12. Further, the totals of carbon concentrations and the nitrogen concentrations in outer ring nitrogen-enriched layer 11B and inner ring nitrogen-enriched layer 12B are at least 0.82 mass % and not more than 1.9 mass %. The aforementioned impurities include unavoidable impurities such as that derived from the raw materials for the steel, that mixed in manufacturing steps and the like.

Figure 3:
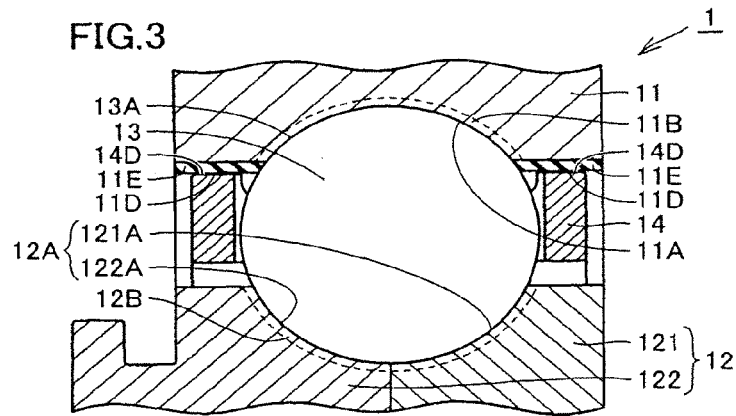
FIG. 3 is an enlarge partially fragmented schematic sectional view showing a principal part of the three-point contact ball bearing shown in FIG. 2.

Referring to FIG. 3, outer ring 11 serving as the race member includes an outer ring contact surface 11D (cage guide surface) as a race member contact surface in contact with cage 14. Further, cage 14 includes a cage contact surface 14D in contact with outer ring 11. In other words, cage 14 of three-point contact ball bearing 1 is guided by outer ring 11. A DLC coating layer 11E as an anti-seizure layer made of DLC is arranged on a region including outer ring contact surface 11D.

Balls 13 serving as the rolling elements are made of ceramics. More specifically, balls 13 are formed by sintered bodies mainly composed of silicon nitride with the rest consisting of impurities in this embodiment. The sintered bodies may contain a sintering assistant such as aluminum oxide ($Al_2O_3$) or yttrium oxide ($Y_2O_3$).

Balls 13 may be made of steel having the aforementioned component composition, similarly to outer ring 11 and inner ring 12. In this case, nitrogen-enriched layers similar in structure to outer ring 11 and inner ring 12 are preferably formed on balls 13.

Outer ring 11 and inner ring 12 serving as the race members of three-point contact ball bearing 1 according to this embodiment are made of the steel having the aforementioned proper component composition, and outer ring nitrogen-enriched layer 11B and inner ring nitrogen-enriched layer 12B having the nitrogen concentrations of at least 0.05 mass % are formed on the regions including outer ring rolling surface 11A and inner ring rolling surface 12A formed on the surfaces thereof. The totals of the carbon concentrations and the nitrogen concentrations in outer ring nitrogen-enriched layer 11B and inner ring nitrogen-enriched layer 12B are so set in the proper range of at least 0.82 mass % and not more than 1.9 mass % that sufficient hardness is supplied to surface layer portions thereof and formation of grain boundary deposits is suppressed. Consequently, outer ring 11 and inner ring 12 serving as the race members in this embodiment are made of steel containing at least 3.75 mass % of chromium and provided with nitrogen-enriched layers 11B and 12B on the surface layer portions thereof, while sufficiently ensuring fatigue strength and toughness.

In three-point contact ball bearing 1 according to this embodiment, DLC coating layer 11E is arranged on the region including outer ring contact surface 11D. Thus, three-point contact ball bearing 1 is a rolling bearing improved in seizure resistance, particularly in dry-run performance.

In three-point contact ball bearing 1 according to this embodiment, balls 13 serving as the rolling elements are made of ceramics. Thus, outer and inner rings 11 and 12 and balls 13 coming into contact with each other are made of different materials, whereby the seizure resistance is improved. Consequently, endurance in a insufficiently lubricated environment such as dry-run performance is improved. The ceramics having higher hardness than the steel is employed as the material for balls 13, whereby durability of balls 13 is improved in a contaminated environment. Further, balls 13 are so made of the ceramics that reduction in hardness of balls 13 in a high-temperature environment is suppressed. In addition, balls 13 are so made of the ceramics that the weights of balls 13 as well as centrifugal force acting on balls 13 are reduced as compared with a case where balls 13 are made of steel, whereby three-point contact ball bearing 1 is preferable as a rolling bearing supporting a member rotating at a high speed, in particular.

When made of steel having a component composition similar to that of the steel forming outer ring 11 and inner ring 12 and provided with similar nitrogen-enriched layers, balls 13 are made of steel containing at least 3.75 mass % of chromium and provided with nitrogen-enriched layers on surface layer portions thereof, while sufficiently ensuring fatigue strength and toughness. Consequently, reduction in hardness of balls 13 is suppressed in a high-temperature environment, and durability of balls 13 is improved in a contaminated environment.

In three-point contact ball bearing 1 according to this embodiment, as hereinabove described, outer ring 11 and inner ring 12 serving as the race members are made of the steel containing at least 3.75 mass % of chromium, whereby reduction in hardness of the components in a high-temperature environment is suppressed. Further, outer ring nitrogen-enriched layer 11B and inner ring nitrogen-enriched layer 12B in which the totals of the carbon concentrations and the nitrogen concentrations are set in the proper range are formed on the regions including outer ring rolling surface 11A and inner ring rolling surface 12A of outer ring 11 and inner ring 12 made of the steel having the proper component composition, whereby the durability of the components in a contaminated environment is improved. In addition, DLC coating layer 11E is formed on the region including outer ring contact surface 11D, whereby the dry-run performance is improved. Consequently, three-point contact ball bearing 1 is a ball bearing attaining not only suppression of reduction in hardness of the components in a high-temperature environment and improvement in durability in a contaminated environment but also improvement of the dry-run performance.

Preferably, the thicknesses of outer ring nitrogen-enriched layer 11B and inner ring nitrogen-enriched layer 12B formed on outer ring 11 and inner ring 12 are at least 0.05 mm. Thus, sufficient strength is supplied to outer ring 11 and inner ring 12.

Preferably, outer ring nitrogen-enriched layer 11B and inner ring nitrogen-enriched layer 12B have hardness of at least 830 HV. Thus, the strength of outer ring 11 and inner ring 12 can be more reliably ensured.

Preferably, the number of nitrides of iron each having an aspect ratio of at least 2 and a length of 7.5 μm is not more than one in five fields of square regions of 150 μm on each side when outer ring nitrogen-enriched layer 11B and inner ring nitrogen-enriched layer 12B are observed with a microscope. Thus, the fatigue strength of outer ring 11 and inner ring 12 can be improved.

Figure 4:
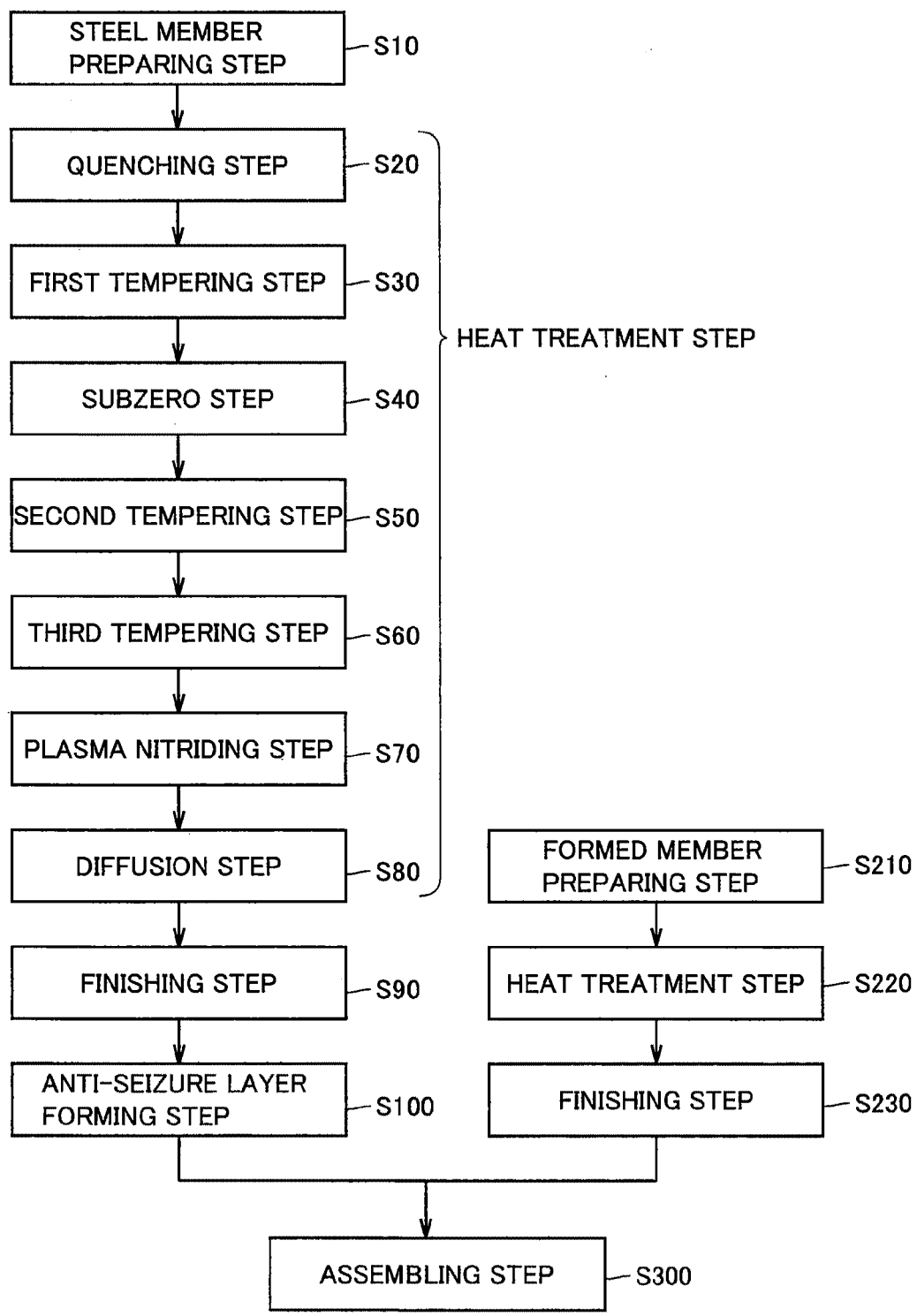
FIG. 4 is a flow chart schematically showing a method of manufacturing a rolling bearing.

A method of manufacturing a rolling bearing according to the aforementioned first embodiment is now described. Referring to FIG. 4, the method of manufacturing a rolling bearing according to this embodiment includes a race member preparing step including steps (S10) to (S100), a cage preparing step including steps (S210) to (S230) and an assembling step carried out as a step (S300).

First, the race member preparing step is described. In a steel member preparing step carried out as the step (S10), steel members made of steel containing at least 0.77 mass % and not more than 0.85 mass % of carbon, at least 0.01 mass % and not more than 0.25 mass % of silicon, at least 0.01 mass % and not more than 0.35 mass % of manganese, at least 0.01 mass % and not more than 0.15 mass % of nickel, at least 3.75 mass % and not more than 4.25 mass % of chromium, at least 4 mass % and not more than 4.5 mass % of molybdenum and at least 0.9 mass % and not more than 1.1 mass % of vanadium with the rest consisting of iron and impurities and formed into substantial shapes of race members are prepared. More specifically, working operations such as cutting, forging and turning are performed on steel bars or steel wires containing the aforementioned components, thereby preparing steel members formed into substantial shapes of outer ring 11 and inner ring 12 as the race members.

Then, a heat treatment step is carried out by performing a heat treatment including quenching and nitriding on the aforementioned steel members prepared in the step (S10). The heat treatment step includes a quenching step carried out as the step (S20), a first tempering step carried out as the step (S30), a subzero step carried out as the step (S40), a second tempering step carried out as the step (S50), a third tempering step carried out as the step (S60), a plasma nitriding step carried out as the step (S70) and a diffusion step carried out as the step (S80). The details of this heat treatment step are described later.

Then, a finishing step performing finishing etc. on the steel members subjected to the heat treatment step is carried out as the step (S90). More specifically, outer ring rolling surface 11A and inner ring rolling surface 12A of the steel members subjected to the heat treatment step are polished, for example. Preferably, the finishing is carried out also on the region to be provided with DLC coating layer 11E in the step (S100) described later.

Then, an anti-seizure layer forming step is carried out as the step (S100). More specifically, DLC coating layer 11E is formed on the steel member for forming outer ring 11 in the steel members subjected to the step (S90). DLC coating layer 11E can be formed by a method such as plasma CVD (chemical vapor deposition) or PVD (physical vapor deposition), for example. Thus, the race members in this embodiment are completed, and the race member preparing step in this embodiment is terminated.

Figure 5:
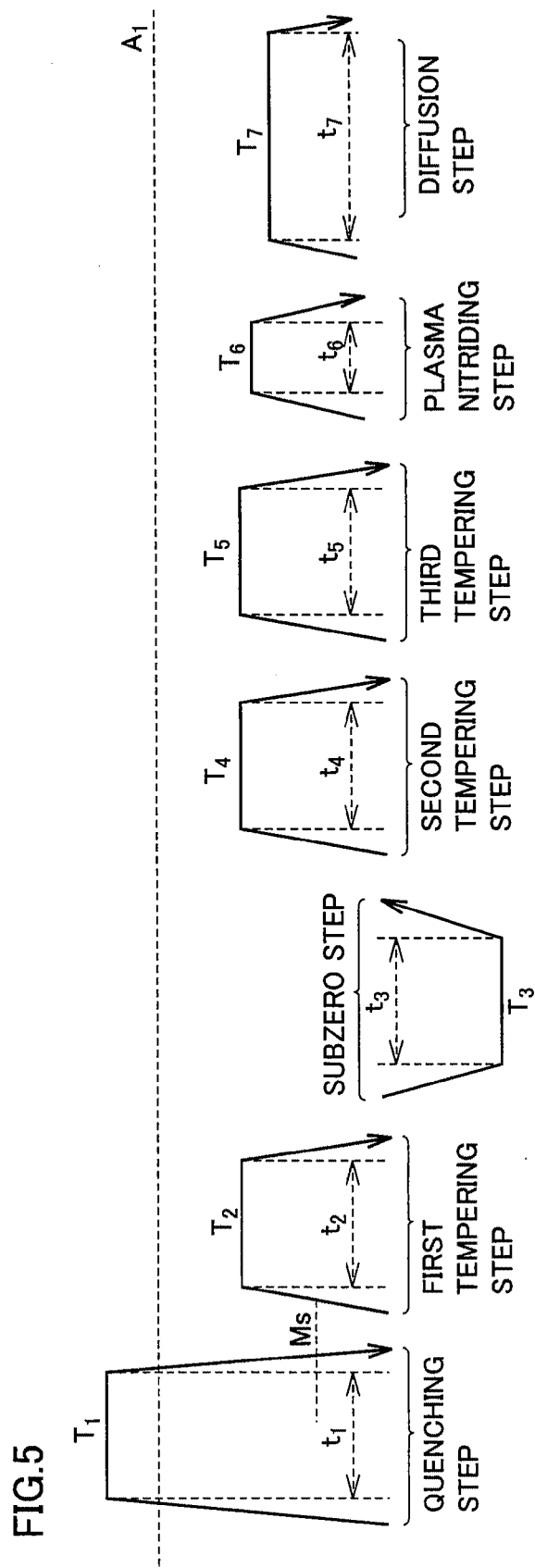
FIG. 5 is a diagram for illustrating the details of a heat treatment step included in race member manufacturing steps.

The details of the aforementioned heat treatment step are now described with reference to FIG. 5. Referring to FIG. 5, time shown in the horizontal direction elapses rightward. Referring to FIG. 5, further, temperature shown in the vertical direction is increased upward.

Referring to FIG. 5, the quenching step of quenching the steel members as the objects to be treated is first carried out in the heat treatment step according to this embodiment. More specifically, the steel members are heated to a temperature $T_1$ exceeding a transformation temperature $A_1$ in a decompressed atmosphere (vacuum) or a salt bath, maintained at this temperature for a time $t_1$, and thereafter cooled from the temperature $T_1$ exceeding the transformation temperature $A_1$ to a temperature below a point $M_s$, to be quenched.

The transformation temperature $A_1$ denotes a point corresponding to a temperature at which the structure of the steel starts transforming from ferrite into austenite. The point $M_s$ denotes a point corresponding to a temperature at which the steel having transformed into austenite starts transforming into martensite when the same is cooled.

Then, the first tempering step is carried out for tempering the steel members subjected to the quenching. More specifically, the steel members are heated to a temperature $T_2$ less than the transformation temperature $A_1$ in a vacuum, maintained at this temperature for a time $t_2$, and thereafter cooled, to be tempered, for example. Thus, residual stress resulting from the quenching of the steel members is relaxed, and strain resulting from the heat treatment is suppressed.

Then, the subzero step is carried out on the steel members subjected to the first tempering step. More specifically, a subzero treatment is performed by spraying liquid nitrogen, for example, onto the steel members for cooling the steel members to a temperature $T_3$ less than 0° C. and maintaining the same at this temperature for a time $t_3$. Thus, retained austenite formed by the quenching of the steel members transforms into martensite, for stabilizing the structure of the steel.

Then, the second tempering step is carried out on the steel members subjected to the subzero step. More specifically, the steel members are heated to a temperature $T_4$ less than the transformation temperature $A_1$ in a vacuum, maintained at this temperature for a time $t_4$, and thereafter cooled, to be tempered, for example. Thus, residual stress resulting from the subzero treatment of the steel members is relaxed, and strain is suppressed.

Then, the steel members subjected to the second tempering step are tempered again through the third tempering step. More specifically, the steel members are heated to a temperature $T_5$ less than the transformation temperature $A_1$ in a vacuum, maintained at this temperature for a time $t_5$, and thereafter cooled, to be tempered similarly to the aforementioned second tempering step, for example. The temperature $T_5$ and the time $t_5$ can be set similarly to the temperature $T_4$ and the time $t_4$ in the second tempering step respectively. Thus, residual stress resulting from the subzero treatment of the steel members is relaxed and strain is suppressed, similarly to the second tempering step. The second and third tempering steps may be carried out as a single step.

Then, the plasma nitriding step is carried out on the steel members subjected to the third tempering step. More specifically, the steel members are inserted into a plasma nitriding furnace into which nitrogen ($N_2$) and at least one element selected from the group consisting of hydrogen ($H_2$), methane ($CH_4$) and argon (Ar) are introduced so that the pressure is at least 50 Pa and not more than 5000 Pa, heated to a temperature $T_6$ under conditions of a discharge voltage of at least 50 V and not more than 1000 V and a discharge current of at least 0.001 A and not more than 100 A, maintained at this temperature for a time $t_6$, and thereafter cooled, to be plasma-nitrided, for example. Thus, nitrogen penetrates into the surface layer portions of the steel members to form nitrogen-enriched layers, thereby improving the strength of the surface layer portions. The temperature $T_6$ can be set to at least 300° C. and not more than 550° C., for example, and the time $t_6$ can be set to at least one hour and not more than 80 hours. The heat treatment conditions such as the temperature $T_6$ and the time $t_6$ can be so decided that grain boundary deposit layers formed in the plasma nitriding treatment have such thicknesses that the grain boundary deposit layers can be removed in the finishing step in consideration of removal amounts in the finishing performed in the finishing step.

When the steel constituting the steel members is AMS 6490 or 6491 (AISI M50), the pressure, the discharge voltage, the discharge current, the temperature $T_6$ and the time $t_6$ in the plasma nitriding step are preferably set to at least 50 Pa and not more than 1000 Pa, at least 50 V and not more than 600 V, at least 0.001 A and not more than 300 A, at least 350° C. and not more than 450° C. and at least one hour and not more than 50 hours respectively.

Then, the diffusion step is carried out on the steel members subjected to the plasma nitriding step. More specifically, the steel members are heated to a temperature $T_7$ in a vacuum and maintained at this temperature for a time $t_7$ to be diffusion-treated, for example. The temperature $T_7$ can be set to at least 300° C. and not more than 480° C., preferably at least 300° C. and not more than 430° C., and the time $t_7$ can be set to at least 50 hours and not more than 300 hours. Thus, the nitrogen having penetrated into the steel can be made to reach desired regions while suppressing cancellation of increase in the hardness of the surface layer portions resulting from formation of nitride layers. The diffusions step is so carried out that the nitrogen having penetrated into the steel can be made to reach the desired regions even if the depths of the penetration of the nitrogen are kept in the range allowing removal of the grain boundary deposit layers in the finishing. The heat treatment step in this embodiment is completed through these steps.

According to the heat treatment method in this embodiment, as hereinabove described, hard nitrogen-enriched layers can be formed by nitriding the surface layer portions of the steel members containing at least 3.75 mass % of chromium, and formation of grain boundary deposits can be suppressed.

According to the race member preparing step in this embodiment, race members (outer ring 11, inner ring 12 etc.) made of steel containing at least 3.75 mass % of chromium, provided with hard nitrogen-enriched layers by nitriding surface layer portions and inhibited from formation of grain boundary deposits can be manufactured. Consequently, the nitrogen-enriched layers having the nitrogen concentrations of at least 0.05 mass %, the totals of the carbon concentrations and the nitrogen concentrations of at least 0.82 mass % and not more than 1.9 mass %, the thicknesses of at least 0.05 mm and the hardness of at least 830 HV are formed on the regions including the surfaces (outer ring rolling surface 11A, inner ring rolling surface 12A etc.) of the race members (outer ring 11, inner ring 12 etc.) in this embodiment as hereinabove described, while the number of detected grain boundary deposits can be reduced to not more than one when each nitrogen-enriched layer is cut along a section perpendicular to the surface thereof and five fields of square regions of 150 µm on each side including the surface are randomly observed with an optical microscope or an SEM. The carbon concentration and the nitrogen concentration in each nitrogen-enriched layer can be controlled by adjusting the treatment time of the plasma nitriding performed in the plasma nitriding step and the treating time of the diffusion treatment performed in the diffusion step, for example.

Referring to FIG. 4, a formed member preparing step of preparing a formed member formed into a substantial shape of a cage is carried out as the step (S210). More specifically, a steel member of SAE 4340, for example, is prepared and subjected to working such as cutting, thereby preparing the formed member.

Then, a heat treatment step of heat-treating the formed member is carried out as the step (S220). More specifically, quenching and tempering are performed on the prepared formed member of SAE 4340, thereby supplying proper hardness to the formed member.

Then, a finishing step is carried out as the step (S230). More specifically, finishing or the like is performed on the formed member subjected to the heat treatment step, for example. The cage preparing step in this embodiment is completed through the aforementioned steps.

Referring to FIG. 4, the assembling step of assembling the completed components into a rolling bearing is carried out as the step (S300). More specifically, outer ring 11, inner ring 12 and cage 14 prepared through the aforementioned steps and separately prepared balls 13 are assembled into three-point contact ball bearing 1, for example. Thus, the rolling bearing according to this embodiment is completed.

When made of ceramics, balls 13 can be prepared as follows: First, powder of the ceramics, such as silicon nitride, for example, employed as the material constituting the rolling elements is prepared. Then, a sintering assistant is added to and mixed with the prepared powder of the ceramics. Then, the mixture of the powder of the ceramics and the sintering assistant is formed into substantial shapes of balls 13. More specifically, the mixture of the powder of the ceramics and the sintering assistant is molded by press molding, casting, extrusion molding or rolling granulation, thereby preparing formed bodies formed into substantial shapes of balls 13 serving as the rolling elements. Further, these formed bodies are sintered. More specifically, the aforementioned formed bodies are sintered by pressure sintering such as HIP (hot isostatic pressing) or GPS (gas pressure sintering), to obtain sintered bodies having substantial shapes of balls 13. Then, the surfaces (rolling surfaces) of the obtained sintered bodies are polished, thereby completing balls 13 as the rolling elements.

When made of steel similar to that constituting outer ring 11 and inner ring 12, balls 13 can be prepared through steps similar to the aforementioned steps (S10) to (S90). If no nitrogen-enriched layers may be formed, the steps (S70) and (S80) can be omitted.

Second Embodiment

Figure 6:
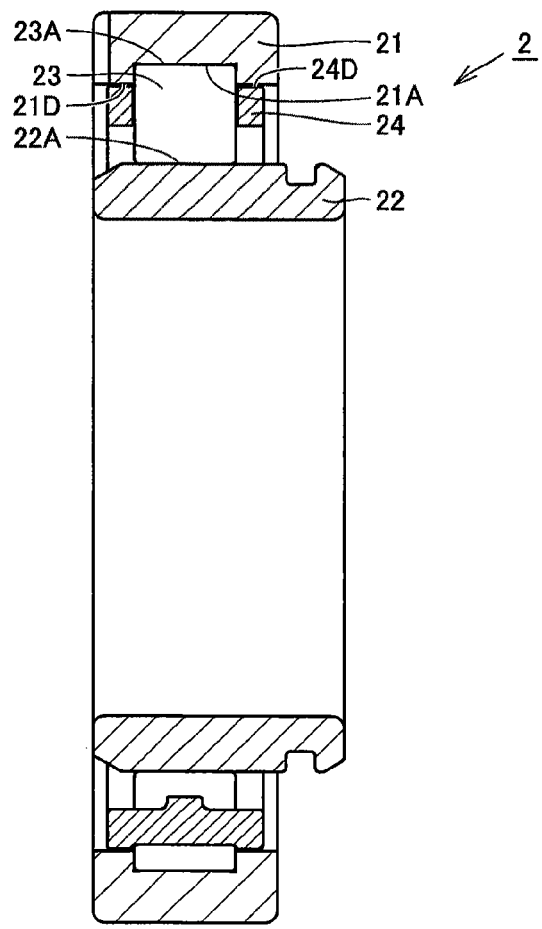
FIG. 6 is a schematic sectional view showing the structure of a cylindrical roller bearing.
Figure 7:
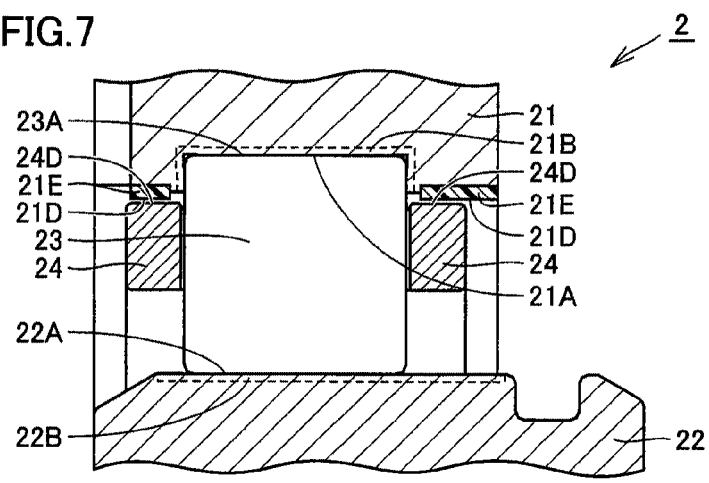
FIG. 7 is a partially fragmented schematic sectional view showing a principal part of the cylindrical roller bearing shown in FIG. 6.

A second embodiment of the present invention is now described. Referring to FIGS. 6 and 7, a cylindrical roller bearing 2 according to the second embodiment is basically similar in structure to three-point contact ball bearing 1 according to the first embodiment, and exhibits functions/effects similar to those of three-point contact ball bearing 1. In other words, cylindrical roller bearing 2 includes an annular outer ring 21, an annular inner ring 22 arranged inside outer ring 21 and a plurality of rollers 23 as rolling elements arranged between outer ring 21 and inner ring 22 and retained in an annular cage 24. Rollers 23 are cylindrical. An outer ring rolling surface 21A is formed on the inner peripheral surface of outer ring 21, while an inner ring rolling surface 22A is formed on the outer peripheral surface of inner ring 22. Outer ring 21 and inner ring 22 are so arranged that inner ring rolling surface 22A and outer ring rolling surface 21A are opposed to each other. Plurality of rollers 23 are in contact with inner ring rolling surface 22A and outer ring rolling surface 21A on roller rolling surfaces 23A which are the outer peripheral surfaces thereof, and arranged at a prescribed pitch in the peripheral direction by cage 24, to be retained on an annular race in a rollable manner. Outer ring 21 and inner ring 22 of cylindrical roller bearing 2 are mutually relatively rotatable due to the aforementioned structure.

Referring to FIG. 7, outer ring 21, inner ring 22 and rollers 23 of cylindrical roller bearing 2 according to this embodiment correspond to outer ring 11, inner ring 12 and balls 13 of three-point contact ball bearing 1 according to the aforementioned first embodiment respectively, have similar structures, and exhibit similar effects. In other words, outer ring 21 and inner ring 22 are made of steel similar to that constituting outer ring 11 and inner ring 12. An outer ring nitrogen-enriched layer 21B and an inner ring nitrogen-enriched layer 22B having nitrogen concentrations of at least 0.05 mass % are formed on regions including outer ring rolling surface 21A and inner ring rolling surface 22A which are the surfaces of outer ring 21 and inner ring 22 respectively. The totals of carbon concentrations and the nitrogen concentrations in outer ring nitrogen-enriched layer 21B and inner ring nitrogen-enriched layer 22B are at least 0.82 mass % and not more than 1.9 mass %. Outer ring 21 and cage 24 have an outer ring contact surface 21D and a cage contact surface 24D corresponding to outer ring contact surface 11D and cage contact surface 14D respectively. In other words, cage 24 of cylindrical roller bearing 2 is guided by outer ring 21.

However, cylindrical roller bearing 2 according to the second embodiment is different from three-point contact ball bearing 1 according to the first embodiment in the structure of an anti-seizure layer. More specifically, a resin ring 21E made of phenol resin or the like having a porous structure to be impregnable with a lubricant is arranged on a region including outer ring contact surface 21A of cylindrical roller bearing 2. MIL-PRF-23699, for example, can be employed as the lubricant.

In cylindrical roller bearing 2 according to the second embodiment, resin ring 21E is so employed as the anti-seizure layer that a coefficient of dynamic friction between outer ring 21 and cage 24 is reduced, and resin ring 21E is worn thereby suppressing occurrence of seizure even if lubrication is insufficient. When lubrication is insufficient, further, the lubricant impregnated into resin ring 21E ensures lubrication during operation of cylindrical roller bearing 2, to further suppress occurrence of seizure. Further, not a coating layer but resin ring 21E is so employed that no complicated coating treatment is required in the process of manufacturing cylindrical roller bearing 2 and the anti-seizure layer can be formed by fitting resin ring 21E into outer ring 21, for example.

A method of manufacturing cylindrical roller bearing 2 according to the second embodiment is now described. Cylindrical roller bearing 2 can be basically manufactured similarly to three-point contact ball bearing 1 according to the aforementioned first embodiment. However, the manufacturing method is partially different, due to the difference in the structure of the anti-seizure layer.

Referring to FIG. 4, a groove for receiving resin ring 21E is formed along the inner peripheral surface of the region of outer ring 21 for arranging resin ring 21E in the step (S10) in the method of manufacturing cylindrical roller bearing 2. After the steps (S20) to (S90) are carried out similarly to the case of the first embodiment, separately prepared resin ring 21E is fitted into the aforementioned groove in the step (S100). The remaining steps are carried out similarly to the first embodiment. Thus, cylindrical roller bearing 2 according to the second embodiment can be completed without performing a complicated coating treatment.

When the anti-seizure layer is formed by fitting resin ring 21E as described above, resin ring 21E may be fitted into the outer peripheral surface of cage 24, while centrifugal force acts in a direction easily displacing resin ring 21E from cage 24 in operation of cylindrical roller bearing 2 in this case. When a race member contact surface is formed on the inner peripheral surface of outer ring 21 (i.e., when cage 24 is guided by outer ring 21), therefore, resin ring 21E is preferably fitted into the inner peripheral surface of outer ring 21, as hereinabove described. When the race member contact surface is formed on the outer peripheral surface of inner ring 22 (i.e., when cage 24 is guided by inner ring 22), on the other hand, resin ring 21E is preferably fitted into the inner peripheral surface of cage 24.

Third Embodiment

Figure 8:
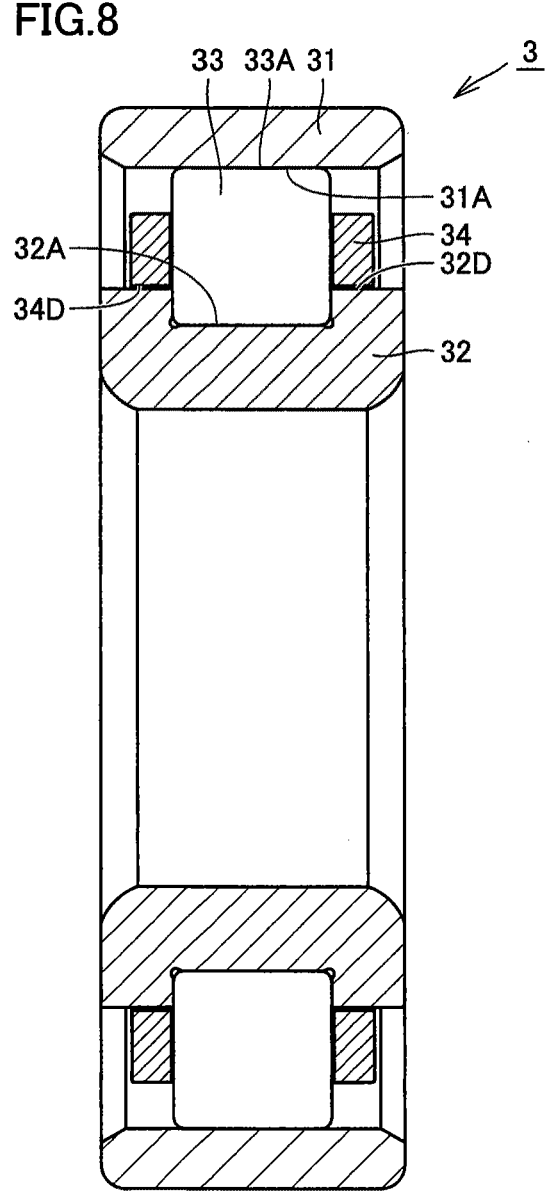
FIG. 8 is a schematic sectional view showing the structure of another cylindrical roller bearing.
Figure 9:
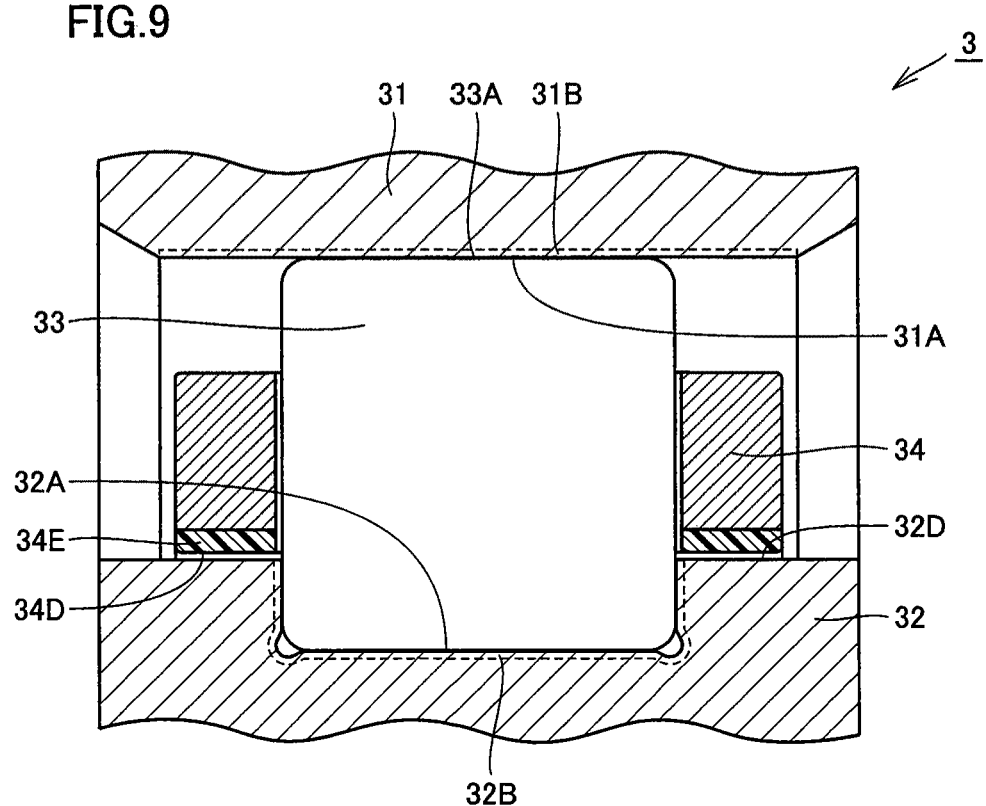
FIG. 9 is a partially fragmented schematic sectional view showing a principal part of the cylindrical roller bearing shown in FIG. 8.

A third embodiment of the present invention is now described. Referring to FIGS. 8 and 9, a cylindrical roller bearing 3 according to the third embodiment is basically similar in structure to three-point contact ball bearing 1 and cylindrical roller bearing 2 according to the first and second embodiments, and exhibits similar functions/effects. In other words, cylindrical roller bearing 3 includes an outer ring 31 corresponding to outer rings 11 and 21, an inner ring 32 corresponding to inner rings 12 and 22, rollers 33, corresponding to balls 13 and rollers 23, in contact with outer ring 31 and inner ring 32 on roller rolling surfaces 33A and a cage 34 corresponding to cages 14 and 24. Outer ring 31 and inner ring 32 include an outer ring nitrogen-enriched layer 31B corresponding to outer ring nitrogen-enriched layers 11B and 21B and an inner ring nitrogen-enriched layer 32B corresponding to inner ring nitrogen-enriched layers 12B and 22B on regions including an outer ring rolling surface 31A and an inner ring rolling surface 32A respectively.

However, cylindrical roller bearing 3 according to the third embodiment is different from three-point contact ball bearing 1 and cylindrical roller bearing 2 according to the first and second embodiments in the structures of a race member contact surface, a cage contact surface and an anti-seizure layer. Referring to FIG. 9, inner ring 32 and cage 34 of cylindrical roller bearing 3 have an inner ring contact surface 32A and a cage contact surface 34D as the race member contact surface and the cage contact surface in contact with each other respectively. In other words, cage 34 of cylindrical roller bearing 3 is guided by inner ring 32. A resin coating layer 34E as the anti-seizure layer is arranged on a region including cage contact surface 34D. Thus, occurrence of seizure is suppressed between cage contact surface 34D and inner ring contact surface 32D.

Figure 10:
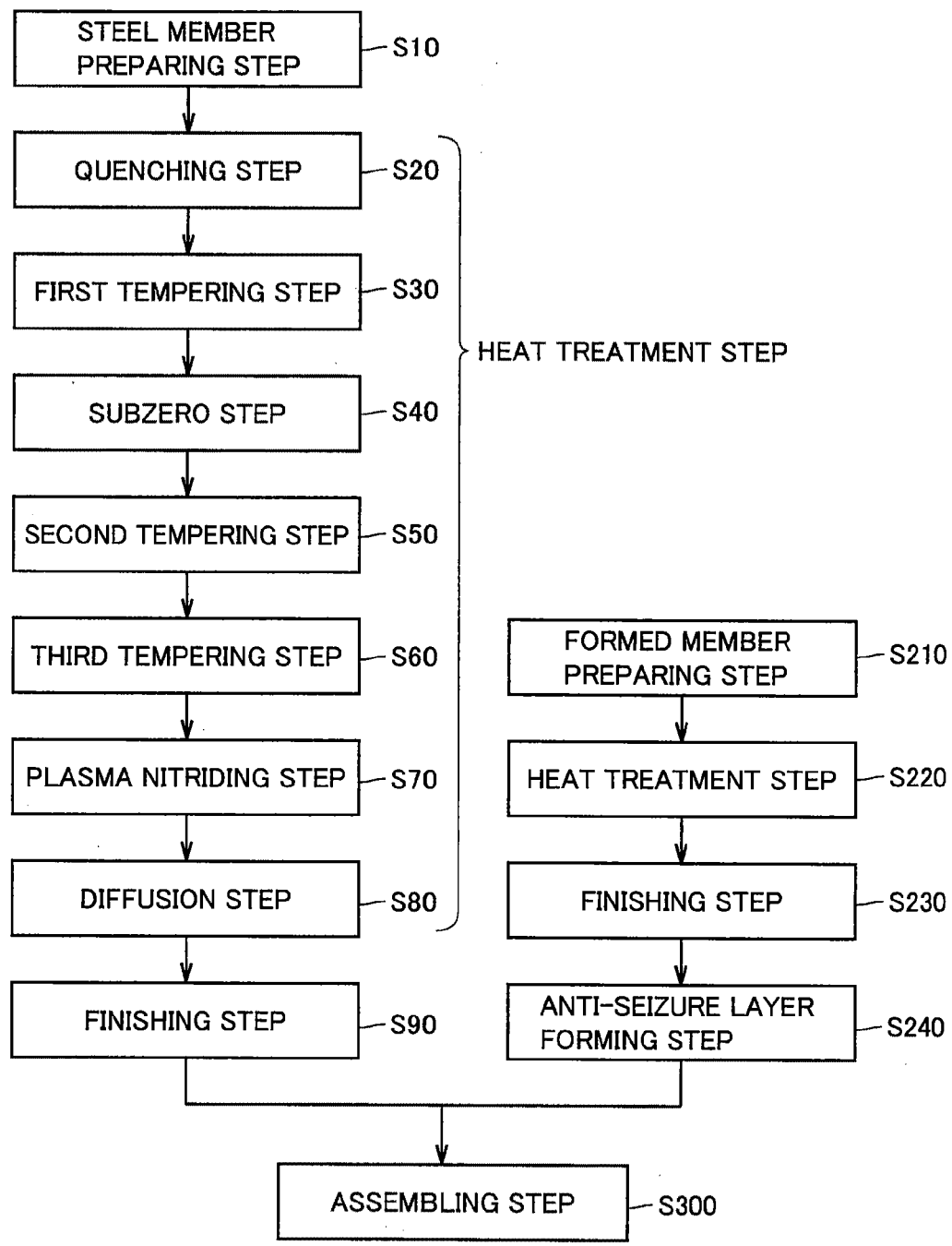
FIG. 10 is a flow chart schematically showing a method of manufacturing a rolling bearing.

A method of manufacturing cylindrical roller bearing 3 according to the third embodiment is now described. Referring to FIGS. 10 and 4, the method of manufacturing cylindrical roller bearing 3 according to the third embodiment is performed basically similarly to the method of manufacturing three-point contact ball bearing 1 according to the first embodiment. However, the method of manufacturing cylindrical roller bearing 3 according to the third embodiment is partially different from that in the first embodiment, due to the aforementioned difference in the structures of the race member contact surface, the cage contact surface and the anti-seizure layer.

In a race member preparing step in the method of manufacturing cylindrical roller bearing 3 according to the third embodiment, the steps (S10) to (S90) are carried out similarly to the case of the first embodiment, while the step (S100) is omitted. In a cage preparing step, on the other hand, the steps (S210) to (S230) are carried out similarly to the case of the first embodiment. Thereafter an anti-seizure layer forming step is further carried out as a step (S240) in the third embodiment. More specifically, resin coating layer 34E is formed on the outer peripheral surface of a formed member completely subjected to the finishing step. Resin coating layer 34E can be formed by compression molding, extrusion molding, injection molding or powder coating, for example. Thus, cage 34 according to this embodiment is completed, and the cage preparing step in this embodiment is terminated.

Then, an assembling step is carried out as the step (S300) similarly to the case of the first embodiment, thereby completing cylindrical roller bearing 3 according to the third embodiment.

Fourth Embodiment

A fourth embodiment of the present invention is now described. A rolling bearing according to the fourth embodiment is basically similar in structure to the case of the aforementioned first embodiment, and can be similarly manufactured. However, the fourth embodiment is different from the first embodiment in the component composition of steel serving as a material and a heat treatment method, as described below.

Referring to FIG. 2, an outer ring 11 and an inner ring 12 serving as race members in the fourth embodiment are constituted of steel containing at least 0.11 mass % and not more than 0.15 mass % of carbon, at least 0.1 mass % and not more than 0.25 mass % of silicon, at least 0.15 mass % and not more than 0.35 mass % of manganese, at least 3.2 mass % and not more than 3.6 mass % of nickel, at least 4 mass % and not more than 4.25 mass % of chromium, at least 4 mass % and not more than 4.5 mass % of molybdenum and at least 1.13 mass % and not more than 1.33 mass % of vanadium with the rest consisting of iron and impurities. Referring to FIG. 2, an outer ring nitrogen-enriched layer 11B and an inner ring nitrogen-enriched layer 12B having nitrogen concentrations of at least 0.05 mass % are formed on regions including an outer ring rolling surface 11A and an inner ring rolling surface 12A which are the surfaces of outer ring 11 and inner ring 12. The totals of carbon concentrations and the nitrogen concentrations in outer ring nitrogen-enriched layer 11B and inner ring nitrogen-enriched layer 12B are at least 0.55 mass % and not more than 1.9 mass %. The aforementioned impurities include unavoidable impurities such as that derived from the raw materials for the steel, that mixed in manufacturing steps and the like.

Balls 13 serving as rolling elements are made of ceramics. More specifically, balls 13 are formed by sintered bodies mainly composed of silicon nitride with the rest consisting of impurities in this embodiment. These sintered bodies may contain a sintering assistant such as aluminum oxide ($Al_2O_3$) or yttrium oxide ($Y_2O_3$).

Balls 13 may be made of steel having the aforementioned component composition, similarly to outer ring 11 and inner ring 12. In this case, nitrogen-enriched layers similar in structure to outer ring 11 and inner ring 12 are preferably formed on balls 13. Balls 13 may be made of AISI M50. In this case, nitrogen-enriched layers basically similar in structure to outer ring 11 and inner ring 12 and having carbon concentrations and nitrogen concentrations of at least 0.82 mass % and not more than 1.9 mass % in total are preferably formed.

Outer ring 11 and inner ring 12 serving as the race members of three-point contact ball bearing 1 according to this embodiment are made of steel having the aforementioned proper component composition, and provided with an outer ring nitrogen-enriched layer 11B and an inner ring nitrogen-enriched layer 12B having nitrogen concentrations of at least 0.05 mass % on regions including outer ring rolling surface 11A and an inner ring rolling surface 12A formed on the surfaces thereof. The totals of carbon concentrations and the nitrogen concentrations in outer ring nitrogen-enriched layer 11B and inner ring nitrogen-enriched layer 12B are set in the proper range of at least 0.55 mass % and not more than 1.9 mass %, so that sufficient hardness is supplied to surface layer portions and formation of grain boundary deposits is suppressed. Consequently, outer ring 11 and inner ring 12 serving as the race members in this embodiment are components made of steel containing at least 4 mass % of chromium and provided with the nitrogen-enriched layers on the surface layer portions thereof, while sufficiently ensuring fatigue strength and toughness.

In three-point contact ball bearing 1 according to this embodiment, further, a DLC coating layer 11E is arranged on a region including an outer ring contact surface 11D. Thus, three-point contact ball bearing 1 is a rolling bearing improved in seizure resistance, particularly in dry-run performance.

In three-point contact ball bearing 1 according to this embodiment, balls 13 serving as rolling elements are made of ceramics. Thus, outer and inner rings 11 and 12 and balls 13 coming into contact with each other are made of different materials, whereby the seizure resistance is improved. Consequently, durability in an insufficiently lubricated environment, such as dry-run performance, for example, is improved. The ceramics having higher hardness than the steel is employed as the material for balls 13, whereby durability of balls 13 is improved in a contaminated environment. Further, balls 13 are so made of the ceramics that reduction in hardness of balls 13 in a high-temperature environment is suppressed. In addition, balls 13 are so made of the ceramics that the weights of balls 13 as well as centrifugal force acting on balls 13 are reduced as compared with a case where balls 13 are made of steel, whereby three-point contact ball bearing 1 is preferable as a rolling bearing supporting a member rotating at a high speed, in particular.

When made of steel such as AISI M50 NiL or M50 and provided with nitrogen-enriched layers, balls 13 are components made of steel containing a sufficient quantity of chromium and provided with nitrogen-enriched layers on surface layer portions thereof while sufficiently ensuring fatigue strength and toughness, similarly to outer ring 11 and inner ring 12. Consequently, reduction in hardness of balls 13 in a high-temperature environment is suppressed, and durability of balls 13 in a contaminated environment is improved.

In three-point contact ball bearing 1 according to this embodiment, as hereinabove described, outer ring 11 and inner ring 12 serving as the race members are made of the steel containing at least 4 mass % of chromium, whereby reduction in hardness of the components in a high-temperature environment is suppressed. Further, outer ring nitrogen-enriched layer 11B and inner ring nitrogen-enriched layer 12B having the totals of the carbon concentrations and the nitrogen concentrations set in the proper range are so formed on the regions including outer ring rolling surface 11A and inner ring rolling surface 12A of outer ring 11 and inner ring 12 made of the steel having the proper component composition that durability of the components in a contaminated environment is improved. In addition, DLC coating layer 11E is so arranged on the region including outer contact surface 11D that the dry-run performance is improved. Consequently, three-point contact ball bearing 1 is a rolling bearing attaining not only suppression of reduction in hardness of the components in a high-temperature environment and improvement in durability in a contaminated environment but also improvement of the dry-run performance.

Preferably, the thicknesses of outer ring nitrogen-enriched layer 11B and inner ring nitrogen-enriched layer 12B formed on outer ring 11 and inner ring 12 are at least 0.05 mm. Thus, sufficient strength is supplied to outer ring 11 and inner ring 12.

Preferably, outer ring nitrogen-enriched layer 11B and inner ring nitrogen-enriched layer 12B have hardness of at least 800 HV. Thus, the strength of outer ring 11 and inner ring 12 can be more reliably ensured.

Preferably, the number of nitrides of iron each having an aspect ratio of at least 2 and a length of 7.5 µm is not more than one in five fields of square regions of 150 µm on each side when outer ring nitrogen-enriched layer 11B and inner ring nitrogen-enriched layer 12B are observed with a microscope. Thus, the fatigue strength of outer ring 11 and inner ring 12 can be improved.

Figure 11:
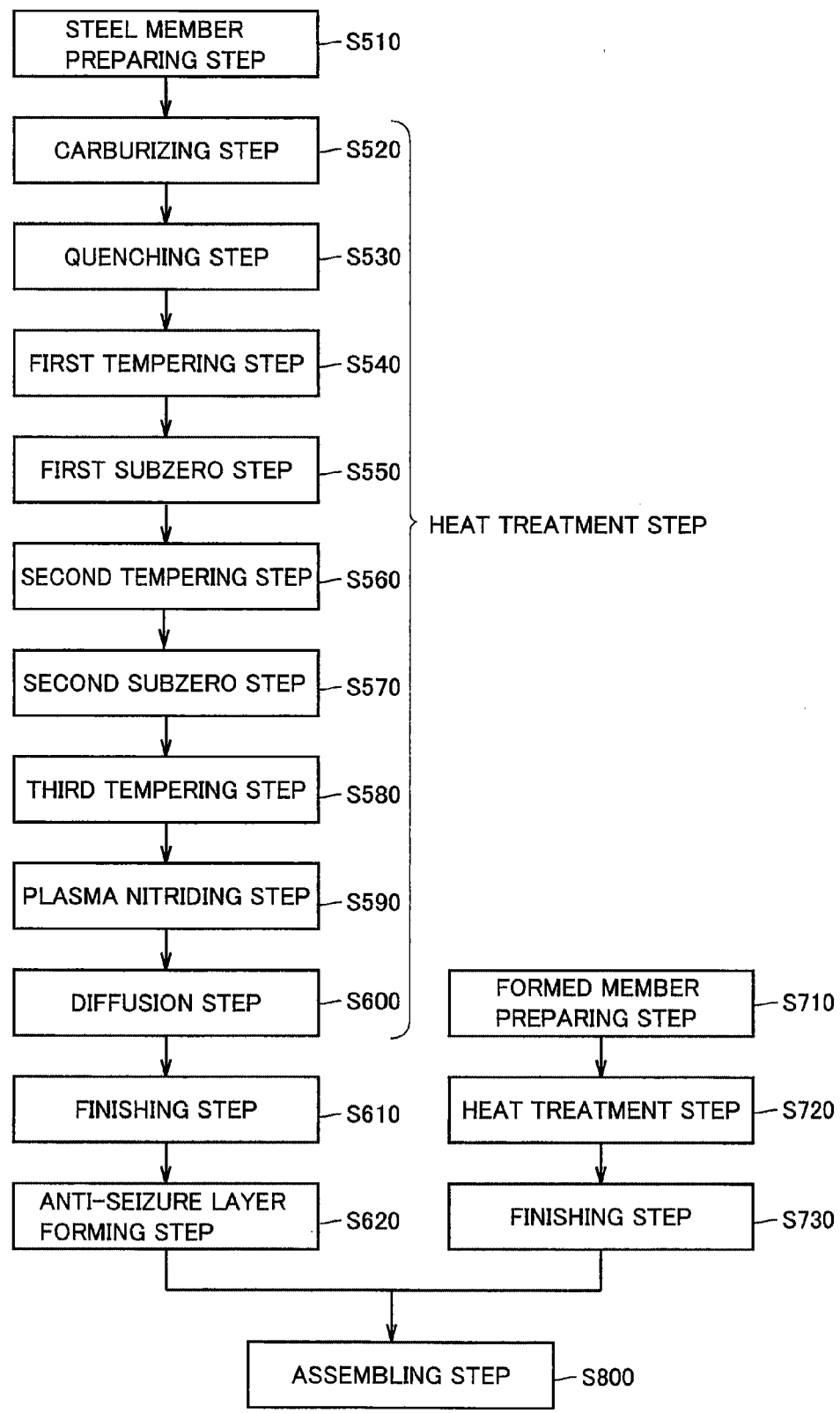
FIG. 11 is a flow chart schematically showing another method of manufacturing a rolling bearing.

A method of manufacturing a rolling bearing according to the fourth embodiment of the present invention is now described. Referring to FIG. 11, the method of manufacturing a rolling bearing according to the fourth embodiment includes a race member preparing step including steps (S510) to (S620), a cage preparing step including steps (S710) to (S730) and an assembling step carried out as a step (S800).

The cage member preparing step is first described. In a steel member preparing step carried out as the step (S510), steel members made of steel containing at least 0.11 mass % and not more than 0.15 mass % of carbon, at least 0.1 mass % and not more than 0.25 mass % of silicon, at least 0.15 mass % and not more than 0.35 mass % of manganese, at least 3.2 mass % and not more than 3.6 mass % of nickel, at least 4 mass % and not more than 4.25 mass % of chromium, at least 4 mass % and not more than 4.5 mass % of molybdenum and at least 1.13 mass % and not more than 1.33 mass % of vanadium with the rest consisting of iron and impurities and formed into substantial shapes of race members are prepared. More specifically, working operations such as cutting, forging and turning are performed on steel bars or steel wires containing the aforementioned components, thereby preparing steel members formed into substantial shapes of outer ring 11 and inner ring 12 as the race members.

Then, a heat treatment step performing heat treatment including quenching and nitriding is carried out on the aforementioned steel members prepared in the step (S510). This heat treatment step includes a carburizing step carried out as the step (S520), a quenching step carried out as the step (S530), a first tempering step carried out as the step (S540), a first subzero step carried out as the step (S550), a second tempering step carried out as the step (S560), a second subzero step carried out as the step (S570), a third tempering step carried out as the step (S580), a plasma nitriding step carried out as the step (S590) and a diffusion step carried out as the step (S600). The details of this heat treatment step are described later.

Then, a finishing step is carried out as the step (S610) on the steel members subjected to the heat treatment step. More specifically, outer ring rolling surface 11A, inner ring rolling surface 12A etc. of the steel members subjected to the heat treatment step are polished, for example. Preferably, the finishing is carried out also on the region to be provided with DLC coating layer 11E in the step (S620) described later.

Then, an anti-seizure layer forming step is carried out as the step (S620). More specifically, DLC coating layer 11E is formed on the steel member for forming outer ring 11 in the steel members subjected to the step (S610). DLC coating layer 11E can be formed by plasma CVD or PVD, for example. Thus, the race members in this embodiment are completed, and the race member preparing step in this embodiment is terminated.

Figure 12:
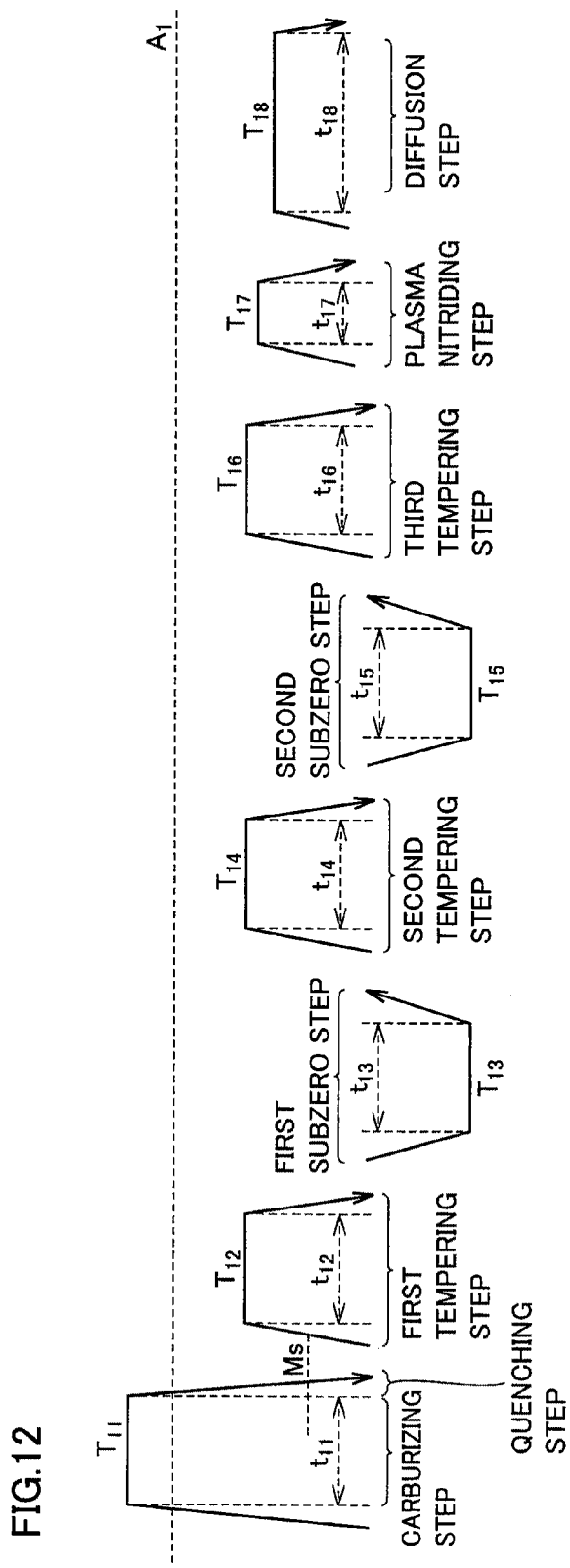
FIG. 12 is a diagram for illustrating the details of a heat treatment step included in race member manufacturing steps.

The details of the aforementioned heat treatment step are now described with reference to FIG. 12. Referring to FIG. 12, time shown in the horizontal direction elapses rightward. Referring to FIG. 12, further, temperature shown in the vertical direction is increased upward.

Referring to FIG. 12, the carburizing step is first carried out for carburizing the steel members as the objects to be treated. More specifically, referring to FIG. 12, the steel members are heated to a temperature $T_{11}$ exceeding the transformation temperature $A_1$ in an atmosphere of carburizing gas containing carbon monoxide and hydrogen and maintained at this temperature for a time $t_{11}$, for example, so that carbon penetrates into surface layer portions of the steel members. Thus, carburized layers having higher carbon concentrations as compared with inner regions other than regions including the surfaces of the steel members are formed on the regions including the surfaces of the steel members.

Referring to FIG. 12, the quenching step is carried out on the steel members subjected to the carburization treatment. More specifically, the steel members are cooled from the temperature $T_{11}$ exceeding the transformation temperature $A_1$ to a temperature below the point $M_s$, to be quench-hardened.

Then, the first tempering step is carried out on the quenched steel members. More specifically, referring to FIG. 12, the steel members are heated to a temperature $T_{12}$ less than the transformation temperature $A_1$ in a decompressed atmosphere (vacuum), maintained at this temperature for a time $t_{12}$, and thereafter cooled to be tempered, for example. Thus, residual stress resulting from the quenching of the steel members is relaxed, and strain resulting from the heat treatment is suppressed.

Then, the first subzero step is carried out on the steel members subjected to the first tempering step. More specifically, referring to FIG. 12, a subzero treatment is performed by spraying liquid nitrogen, for example, onto the steel members for cooling the steel members to a temperature $T_{13}$ less than 0° C. and maintaining the same at this temperature for a time $t_{13}$. Thus, retained austenite formed by the quenching of the steel members transforms into martensite, for stabilizing the structure of the steel.

Then, the second tempering step is carried out on the steel members subjected to the subzero step. More specifically, referring to FIG. 12, the steel members are heated to a temperature $T_{14}$ less than the transformation temperature $A_1$ in a vacuum, maintained at this temperature for a time $t_{14}$, and thereafter cooled, to be tempered, for example. Thus, residual stress resulting from the subzero treatment of the steel members is relaxed, and strain is suppressed.

Then, the second subzero step is carried out on the steel members subjected to the second tempering step. More specifically, referring to FIG. 12, the subzero treatment is performed again by spraying liquid nitrogen, for example, onto the steel members for cooling the steel members to a temperature $T_{15}$ less than 0° C. and maintaining the same at this temperature for a time $t_{15}$. Thus, retained austenite formed by the quenching of the steel members further transforms into martensite, for further stabilizing the structure of the steel.

Then, the third tempering step is carried out on the steel members subjected to the second subzero step. More specifically, referring to FIG. 12, the steel members are heated to a temperature $T_{16}$ less than the transformation temperature $A_1$ in a vacuum, maintained at this temperature for a time $t_{16}$, and thereafter cooled, to be tempered, for example, similarly to the aforementioned second tempering step. The temperature $T_{16}$ and the time $t_{16}$ can be set similarly to the temperature $T_{14}$ and the time $t_{14}$ in the second tempering step respectively. Thus, residual stress which can result from the subzero treatment of the steel members in the second subzero step is relaxed, and strain is suppressed.

Then, the plasma nitriding step is carried out on the steel members subjected to the third tempering step. More specifically, referring to FIG. 12, the steel members are inserted into a plasma nitriding furnace into which nitrogen ($N_2$) and at least one element selected from the group consisting of hydrogen ($H_2$), methane ($CH_4$) and argon (Ar) are introduced so that the pressure is at least 50 Pa and not more than 5000 Pa, heated to a temperature $T_{17}$ under conditions of a discharge voltage of at least 50 V and not more than 1000 V and a discharge current of at least 0.001 A and not more than 100 A, maintained at this temperature for a time $t_{17}$, and thereafter cooled, to be plasma-nitrided, for example. Thus, nitrogen penetrates into the surface layer portions of the steel members to form nitrogen-enriched layers, thereby improving the strength of the surface layer portions. The temperature $T_{17}$ can be set to at least 300° C. and not more than 550° C., for example, and the time $t_{17}$ can be set to at least one hour and not more than 80 hours. The heat treatment conditions such as the temperature $T_{17}$ and the time $t_{17}$ can be so decided that grain boundary deposit layers (layers provided with grain boundary deposits) formed in the plasma nitriding treatment have such thicknesses that the grain boundary deposit layers can be removed in the finishing step in consideration of removal amounts in the finishing performed in the finishing step.

When the steel constituting the steel members is AMS 6278 (AISI M50 NiL), the pressure, the discharge voltage, the discharge current, the temperature $T_{17}$ and the time $t_{17}$ in the plasma nitriding step are preferably set to at least 50 Pa and not more than 1000 Pa, at least 50 V and not more than 600 V, at least 0.001 A and not more than 300 A, at least 350° C. and not more than 450° C. and at least one hour and not more than 50 hours respectively.

Then, the diffusion step is carried out on the steel members subjected to the plasma nitriding step. More specifically, referring to FIG. 12, the steel members are heated to a temperature $T_{18}$ in a vacuum and maintained at this temperature for a time $t_{18}$, to be diffusion-treated, for example. The temperature $T_{18}$ can be set to at least 300° C. and not more than 480° C., preferably at least 300° C. and not more than 430° C., and the time $t_{18}$ can be set to at least 50 hours and not more than 300 hours. Thus, the nitrogen having penetrated into the steel can be made to reach desired regions while suppressing cancellation of increase in the hardness of the surface layer portions resulting from formation of nitride layers. The diffusions step is so carried out that the nitrogen having penetrated into the steel can be made to reach the desired regions even if the depths of the penetration of the nitrogen are kept in the range allowing removal of the grain boundary deposit layers in the finishing. The heat treatment step in this embodiment is completed through these steps.

According to the heat treatment method in this embodiment, as hereinabove described, hard nitrogen-enriched layers can be formed by nitriding the surface layer portions of the steel members containing at least 4 mass % of chromium, and formation of grain boundary deposits can be suppressed.

According to the race member preparing step in this embodiment, race members (outer ring 11, inner ring 12 etc.) made of steel containing at least 4 mass % of chromium, provided with hard nitrogen-enriched layers by nitriding surface layer portions and inhibited from formation of grain boundary deposits can be manufactured. Consequently, the nitrogen-enriched layers having the nitrogen concentrations of at least 0.05 mass %, the totals of the carbon concentrations and the nitrogen concentrations of at least 0.55 mass % and not more than 1.9 mass %, the thicknesses of at least 0.05 mm and the hardness of at least 830 HV are formed on the regions including the surfaces (outer ring rolling surface 11A, inner ring rolling surface 12A etc.) of the race members (outer ring 11, inner ring 12 etc.) in this embodiment as hereinabove described, while the number of detected grain boundary deposits can be reduced to not more than one when each nitrogen-enriched layer is cut along a section perpendicular to the surface thereof and five fields of square regions of 150 μm on each side including the surface are randomly observed with an optical microscope or an SEM. The carbon concentration and the nitrogen concentration in each nitrogen-enriched layer can be controlled by adjusting the treatment time of the plasma nitriding performed in the plasma nitriding step and the treating time of the diffusion treatment performed in the diffusion step, for example.

Referring to FIG. 11, a formed member preparing step of preparing a formed member formed into a substantial shape of a cage is first carried out as the step (S710) in the cage preparing step. More specifically, a steel member of SAE 4340, for example, is prepared and subjected to working such as cutting, thereby preparing the formed member.

Then, a heat treatment step of heat-treating the formed member is carried out as the step (S720). More specifically, quenching and tempering are performed on the prepared formed member of SAE 4340, thereby supplying proper hardness to the formed member.

Then, a finishing step is carried out as the step (S730). More specifically, finishing or the like is performed on the formed member subjected to the heat treatment step, for example. The cage preparing step in this embodiment is completed through the aforementioned steps.

Referring to FIG. 11, the assembling step of assembling the completed components into a rolling bearing is carried out as the step (S800). More specifically, outer ring 11, inner ring 12 and cage 14 prepared through the aforementioned steps and separately prepared balls 13 are assembled into three-point contact ball bearing 1, for example. Thus, the rolling bearing according to this embodiment is completed.

When made of ceramics, balls 13 can be prepared as follows: First, powder of the ceramics, such as silicon nitride, for example, employed as the material constituting balls 13 is prepared. Then, a sintering assistant is added to and mixed with the prepared powder of the ceramics. Then, the mixture of the powder of the ceramics and the sintering assistant is formed into substantial shapes of balls 13. More specifically, the mixture of the powder of the ceramics and the sintering assistant is formed by press molding, casting, extrusion molding or rolling granulation, thereby preparing formed bodies formed into substantial shapes of balls 13 serving as the rolling elements. Further, these formed bodies are sintered. More specifically, the aforementioned formed bodies are sintered by pressure sintering such as HIP or GPS, to obtain sintered bodies having substantial shapes of balls 13. Then, the surfaces (rolling surfaces) of the obtained sintered bodies are polished, thereby completing balls 13 as the rolling elements.

When made of steel similar to that constituting outer ring 11 and inner ring 12, balls 13 can be prepared through steps similar to the aforementioned steps (S510) to (S610). If no nitrogen-enriched layers may be formed, the steps (S590) and (S600) can be omitted. Also when made of AISI M50, for example, balls 13 can be similarly prepared except that the carburizing step is omitted from the heat treatment step.

Fifth Embodiment

A fifth embodiment of the present invention is now described with reference to FIGS. 6 and 7. Referring to FIGS. 6 and 7, a cylindrical roller bearing 2 according to the fifth embodiment is basically similar in structure to three-point contact ball bearing 1 according to the fourth embodiment, and exhibits similar functions/effects. In other words, cylindrical roller bearing 2 includes an annular outer ring 21, an annular inner ring 22 arranged inside outer ring 21 and a plurality of rollers 23 as rolling elements arranged between outer ring 21 and inner ring 22 and retained in an annular cage 24. Roller 23 are cylindrical. An outer ring rolling surface 21A is formed on the inner peripheral surface of outer ring 21, while inner ring rolling surface 22A is formed on the outer peripheral surface of inner ring 22. Outer ring 21 and inner ring 22 are so arranged that inner ring rolling surface 22A and outer ring rolling surface 21A are opposed to each other. Plurality of rollers 23 are in contact with inner ring rolling surface 22A and outer ring rolling surface 21A on roller rolling surfaces 23A which are the outer peripheral surfaces thereof, and arranged at a prescribed pitch in the peripheral direction by cage 24, to be retained on an annular race in a rollable manner. Outer ring 21 and inner ring 22 of cylindrical roller bearing 2 are mutually relatively rotatable due to the aforementioned structure.

Referring to FIG. 7, outer ring 21, inner ring 22 and rollers 23 of cylindrical roller bearing 2 according to this embodiment correspond to outer ring 11, inner ring 12 and balls 13 of three-point contact ball bearing 1 according to the aforementioned fourth embodiment respectively, have similar structures, and exhibit similar effects. In other words, outer ring 21 and inner ring 22 are made of steel similar to that constituting outer ring 11 and inner ring 12. An outer ring nitrogen-enriched layer 21B and an inner ring nitrogen-enriched layer 22B having nitrogen concentrations of at least 0.05 mass % are formed on regions including outer ring rolling surface 21A and inner ring rolling surface 22A which are the surfaces of outer ring 21 and inner ring 22 respectively. The totals of carbon concentrations and the nitrogen concentrations in outer ring nitrogen-enriched layer 21B and inner ring nitrogen-enriched layer 22B are at least 0.55 mass % and not more than 1.9 mass %. Outer ring 21 and cage 24 have an outer ring contact surface 21D and a cage contact surface 24D corresponding to outer ring contact surface 11D and cage contact surface 14D respectively. In other words, cage 24 of cylindrical roller bearing 2 is guided by outer ring 21.

However, cylindrical roller bearing 2 according to the fifth embodiment is different from three-point contact ball bearing 1 according to the fourth embodiment in the structure of an anti-seizure layer. More specifically, referring to FIG. 7, a resin ring 21E made of phenol resin or the like having a porous structure to be impregnable with a lubricant is arranged on a region including outer ring contact surface 21D of cylindrical roller bearing 2. MIL-PRF-23699, for example, can be employed as the lubricant.

In cylindrical roller bearing 2 according to the fifth embodiment, resin ring 21E is so employed as the anti-seizure layer that a coefficient of dynamic friction between outer ring 21 and cage 24 is reduced, and resin ring 21E is worn thereby suppressing occurrence of seizure even if lubrication is insufficient. When lubrication is insufficient, further, the lubricant impregnated into resin ring 21E ensures lubrication during operation of cylindrical roller bearing 2, to further suppress occurrence of seizure. Further, not a coating layer but resin ring 21E is so employed that no complicated coating treatment is required in the process of manufacturing cylindrical roller bearing 2 and the anti-seizure layer can be formed by fitting resin ring 21E into outer ring 21, for example.

A method of manufacturing cylindrical roller bearing 2 according to the fifth embodiment is now described. Cylindrical roller bearing 2 can be basically manufactured similarly to three-point contact ball bearing 1 according to the aforementioned fourth embodiment. However, the manufacturing method is partially different due to the difference in the structure of the anti-seizure layer.

Referring to FIG. 11, a groove for receiving resin ring 21E is formed along the inner peripheral surface of the region of outer ring 21 for arranging resin ring 21E in the step (S510) in the method of manufacturing cylindrical roller bearing 2. After the steps (S520) to (S610) are carried out similarly to the case of the fourth embodiment, separately prepared resin ring 21E is fitted into the aforementioned groove in the step (S620). The remaining steps are carried out similarly to the fourth embodiment. Thus, cylindrical roller bearing 2 according to the fifth embodiment can be completed without performing a complicated coating treatment.

When the anti-seizure layer is formed by fitting resin ring 21E as described above, resin ring 21E may be fitted into the outer peripheral surface of cage 24, while centrifugal force acts in a direction easily displacing resin ring 21E from cage 24 in operation of cylindrical roller bearing 2 in this case. When a race member contact surface is formed on the inner peripheral surface of outer ring 21 (i.e., when cage 24 is guided by outer ring 21), therefore, resin ring 21E is preferably fitted into the inner peripheral surface of outer ring 21, as hereinabove described. When the race member contact surface is formed on the outer peripheral surface of inner ring 22 (i.e., when cage 24 is guided by inner ring 22), on the other hand, resin ring 21E is preferably fitted into the inner peripheral surface of cage 24.

Sixth Embodiment

A sixth embodiment of the present invention is now described with reference to FIGS. 8 and 9. Referring to FIGS. 8 and 9, a cylindrical roller bearing 3 according to the sixth embodiment is basically similar in structure to three-point contact ball bearing 1 and cylindrical roller bearing 2 according to the fourth and fifth embodiments, and exhibits similar functions/effects. In other words, cylindrical roller bearing 3 includes an outer ring 31 corresponding to outer rings 11 and 21, an inner ring 32 corresponding to inner rings 12 and 22, rollers 33 corresponding to balls 13 and rollers 23 and coming into contact with outer ring 31 and inner ring 32 on roller rolling surfaces 33A and a cage 34 corresponding to cages 14 and 24. Outer ring 31 and inner ring 32 include an outer ring nitrogen-enriched layer 31B corresponding to outer ring nitrogen-enriched layers 11B and 21B and an inner ring nitrogen-enriched layer 32B corresponding to inner ring nitrogen-enriched layers 12B and 22B on regions including an outer ring rolling surface 31A and an inner ring rolling surface 32A respectively.

However, cylindrical roller bearing 3 according to the sixth embodiment is different from three-point contact ball bearing 1 and cylindrical roller bearing 2 according to the fourth and fifth embodiments in the structures of a race member contact surface, a cage contact surface and an anti-seizure layer. Referring to FIG. 9, inner ring 32 and cage 34 of cylindrical roller bearing 3 have an inner ring contact surface 32D and a cage contact surface 34D coming into contact with each other respectively. In other words, cage 34 of cylindrical roller bearing 3 is guided by inner ring 32. A resin coating layer 34E as the anti-seizure layer is arranged on a region including cage contact surface 34D. Thus, occurrence of seizure is suppressed between cage contact surface 34D and inner ring contact surface 32D.

Figure 13:
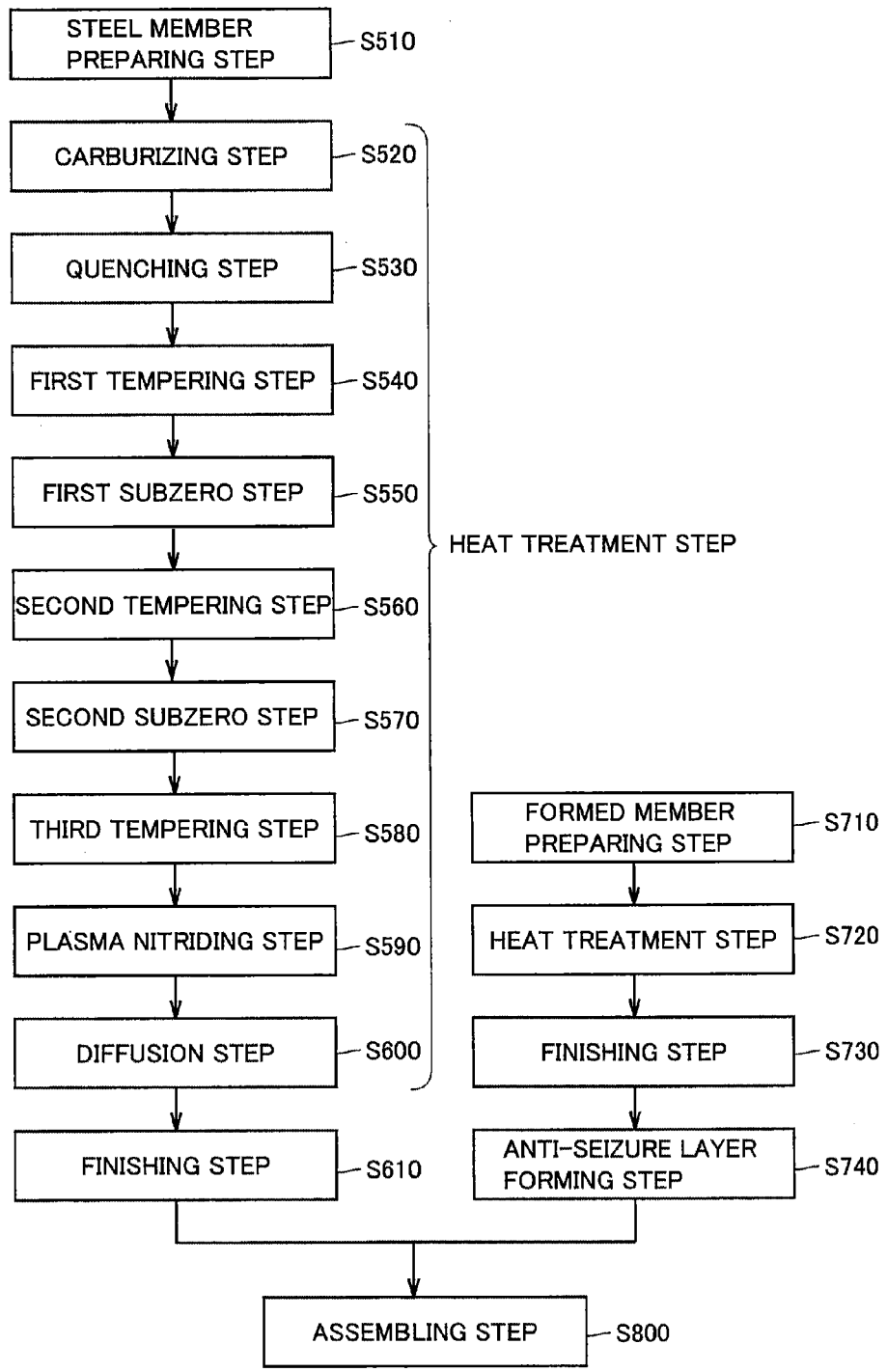
FIG. 13 is a flow chart schematically showing still another method of manufacturing a rolling bearing.

A method of manufacturing cylindrical roller bearing 3 according to the sixth embodiment is now described with reference to FIG. 13. Referring to FIGS. 13 and 11, the method of manufacturing cylindrical roller bearing 3 according to the sixth embodiment is performed basically similarly to the method of manufacturing three-point contact ball bearing 1 according to the fourth embodiment. However, the method of manufacturing cylindrical roller bearing 3 according to the sixth embodiment is partially different from the method of manufacturing three-point contact ball bearing 1 according to the fourth embodiment, due to the difference in the structures of the race member contact surface, the cage contact surface and the anti-seizure layer.

In a race member preparing step of the method of manufacturing cylindrical roller bearing 3 according to the sixth embodiment, the steps (S510) to (S610) are carried out similarly to the case of the fourth embodiment, while the step (S620) is omitted. In a cage preparing step, on the other hand, the steps (S710) to (S730) are carried out similarly to the case of the fourth embodiment. Thereafter an anti-seizure layer forming step is further carried out as a step (S740) in the sixth embodiment. More specifically, resin coating layer 34E is formed on the inner peripheral surface of a formed member completely subjected to a finishing step. Resin coating layer 34E can be formed by compression molding, extrusion molding, injection molding or powder coating, for example. Thus, cage 34 according to this embodiment is completed, and the cage preparing step in this embodiment is terminated.

Then, an assembling step is carried out as the step (S800) similarly to the case of the fourth embodiment, thereby completing cylindrical roller bearing 3 according to the sixth embodiment.

While the three-point contact ball bearing or the cylindrical roller bearing has been described as an example of the rolling bearing according to the present invention in each of the aforementioned embodiments, the rolling bearing according to the present invention is not restricted to this but may be a deep groove ball bearing, an angular contact ball bearing, a thrust needle roller bearing, a self-aligning ball bearing or a self-aligning roller bearing, for example. While the anti-seizure layer is formed on one of the race member contact surface and the cage contact surface coming into contact with each other in each of the aforementioned embodiments, such anti-seizure layers may be formed on both of the race member contact surface and the cage contact surface.

While such expression has been employed in this specification that the race member includes the race member contact surface coming into contact with the cage and the cage includes the cage contact surface coming into contact with the race member, this means that the race member and the cage are arranged in a state contactable with each other in operation of the rolling bearing.

Example 1

Example 1 of the present invention is now described. A sample having a structure similar to that of the race member constituting the rolling bearing according to the aforementioned first aspect of the present invention was actually prepared by the heat treatment method according to the aforementioned first embodiment, and subjected to an experiment of confirming that formation of grain boundary deposits on a surface layer portion was suppressed. The procedure of the experiment is as follows:

First, a test piece having an outer diameter $\phi$ of 40 mm, an inner diameter $\phi$ of 30 mm and a thickness t of 16 mm was manufactured by preparing a steel material made of AMS 6490 (AISI M50) containing at least 0.77 mass % and not more than 0.85 mass % of carbon, at least 0.01 mass % and not more than 0.25 mass % of silicon, at least 0.01 mass % and not more than 0.35 mass % of manganese, at least 0.01 mass % and not more than 0.15 mass % of nickel, at least 3.75 mass % and not more than 4.25 mass % of chromium, at least 4 mass % and not more than 4.5 mass % of molybdenum and at least 0.9 mass % and not more than 1.1 mass % of vanadium with the rest consisting of iron and impurities and working the same.

Then, a heat treatment step employing the heat treatment method described with reference to FIG. 5 in the above was carried out on this test piece. The temperatures $T_1$, $T_2$, $T_3$, $T_4$ and $T_5$ and the times $t_1$, $t_2$, $t_3$, $t_4$ and $t_5$ were so set that the hardness of the test piece after the third tempering step was at least 58 HRC and not more than 65 HRC, while the temperatures $T_6$ and $T_7$ were set to 430° C. respectively and the times $t_6$ and $t_7$ were set to 10 hours and 160 hours respectively. In the plasma nitriding step, the discharge voltage and the discharge current were controlled in the ranges of at least 200 V and not more than 450 V and at least 1 A and not more than 5 A respectively, so that the treatment temperature $T_6$ in the plasma nitriding was 430° C. In the plasma nitriding step, further, gas was introduced into a furnace in the ratio of nitrogen ($N_2$):hydrogen ($H_2$)=1:1 so that the pressure in the furnace was at least 267 Pa and not more than 400 Pa in the plasma nitriding.

The diffusion step was so carried out that the test piece was heated in an atmosphere furnace with a nitrogen atmosphere to adjust the total of a carbon concentration and a nitrogen concentration in the surface of the test piece being not more than 1.9 mass %. The test piece subjected to the heat treatment step similar to the aforementioned one was employed as the sample according to Example of the present invention (Example A).

On the other hand, a heat treatment step similar to the aforementioned heat treatment method described with reference to FIG. 5 was carried out on a similarly prepared test piece of AMS 6490 without carrying out the diffusion step. The temperatures $T_1$, $T_2$, $T_3$, $T_4$ and $T_5$ and the times $t_1$, $t_2$, $t_3$, $t_4$ and $t_5$ were so set that the hardness of the test piece after the third tempering step was at least 58 HRC and not more than 65 HRC, while the temperature $T_6$ was set to 480° C. and the time $t_6$ was set to 30 hours. In the plasma nitriding step, the discharge voltage and the discharge current were controlled in the ranges of at least 200 V and not more than 450 V and at least 1 A and not more than 5 A respectively, so that the treatment temperature $T_6$ in the plasma nitriding was 480° C. In the plasma nitriding step, further, gas was introduced into a furnace in the ratios of nitrogen ($N_2$):hydrogen ($H_2$):methane ($CH_4$)=79:80:1 so that the pressure in the furnace was at least 267 Pa and not more than 400 Pa in the plasma nitriding. The test piece subjected to the aforementioned heat treatment step was employed as a sample according to comparative example (comparative example A).

The samples according to Example A and comparative example A prepared in the aforementioned manner were cut along sections perpendicular to the surfaces thereof, and these sections were polished. Further, the polished sections were etched with a etchant, and five fields of square regions of 150 μm on each side including the surface were thereafter randomly observed on each sample.

Figure 14:
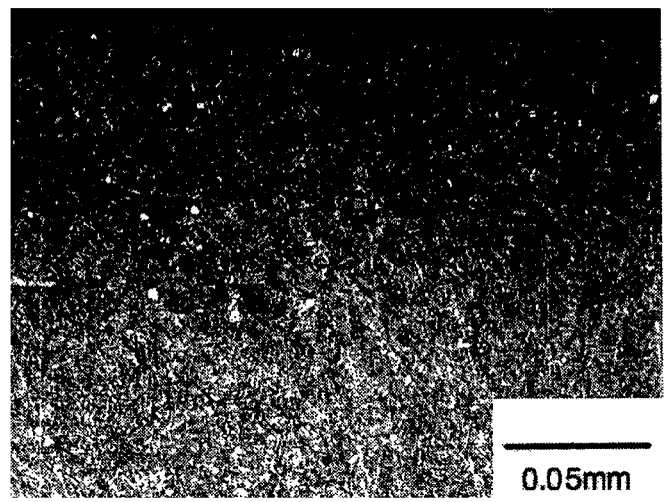
FIG. 14 is an optical micrograph of a microstructure around the surface of Example A.
Figure 15:
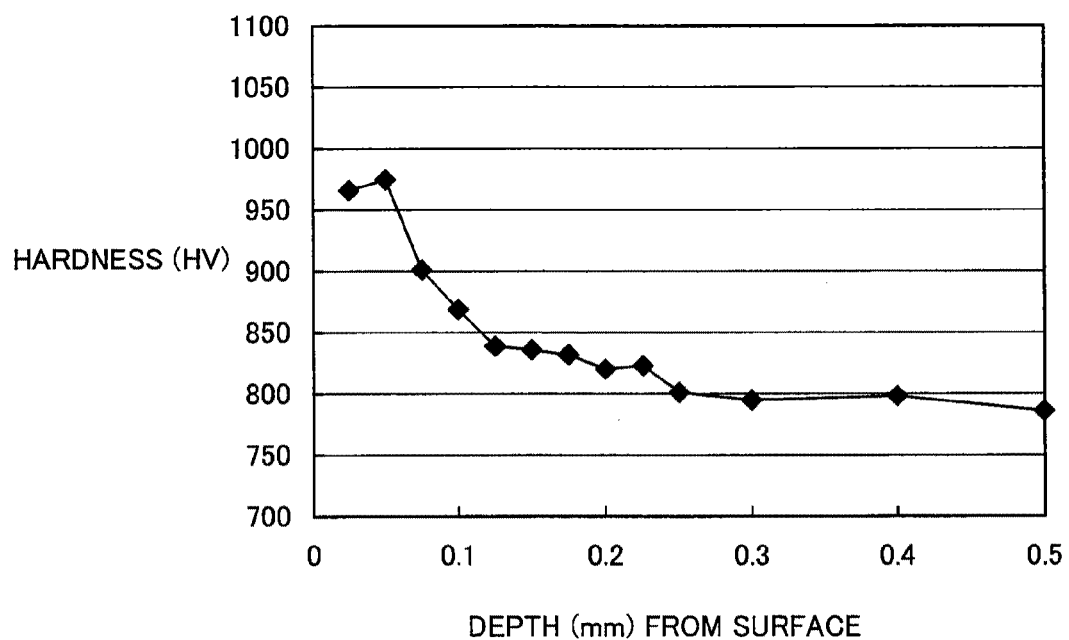
FIG. 15 illustrates a hardness distribution around the surface of Example A.
Figure 16:
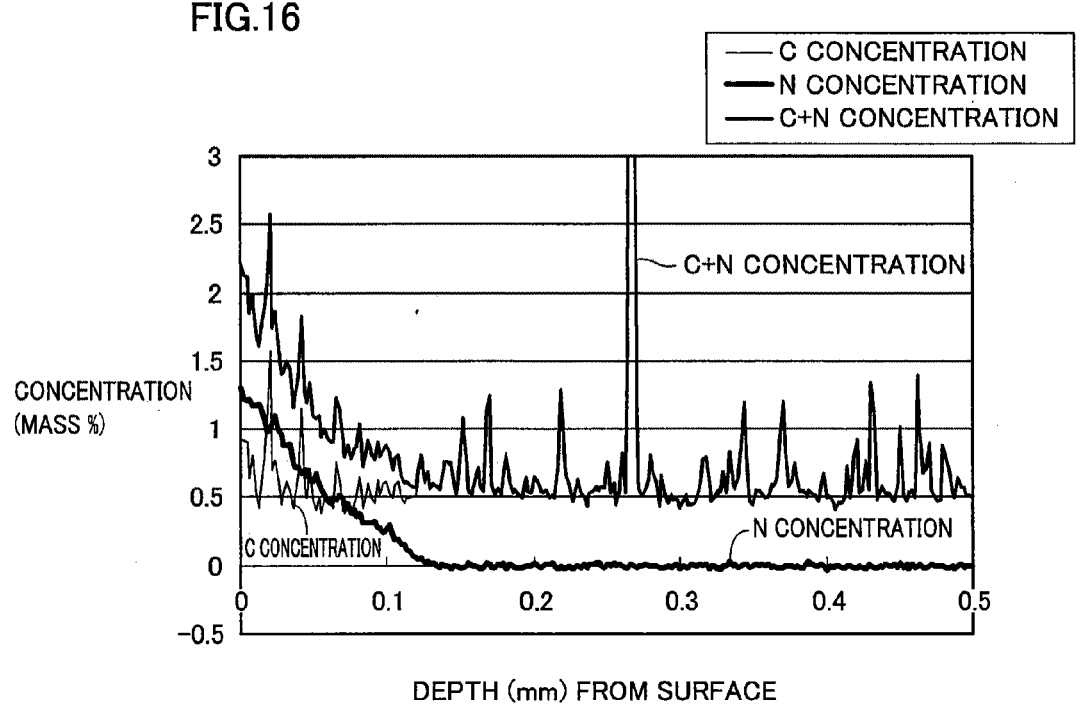
FIG. 16 illustrates distributions of concentrations of carbon and nitrogen around the surface of Example A.
Figure 17:
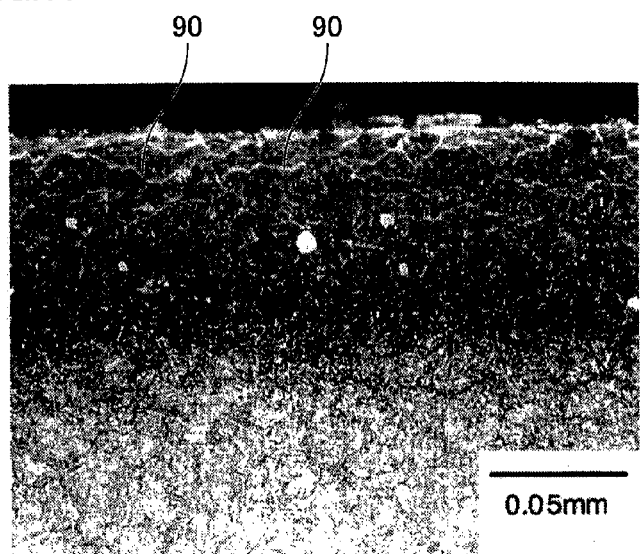
FIG. 17 is an optical micrograph of a microstructure around the surface of comparative example A.
Figure 18:
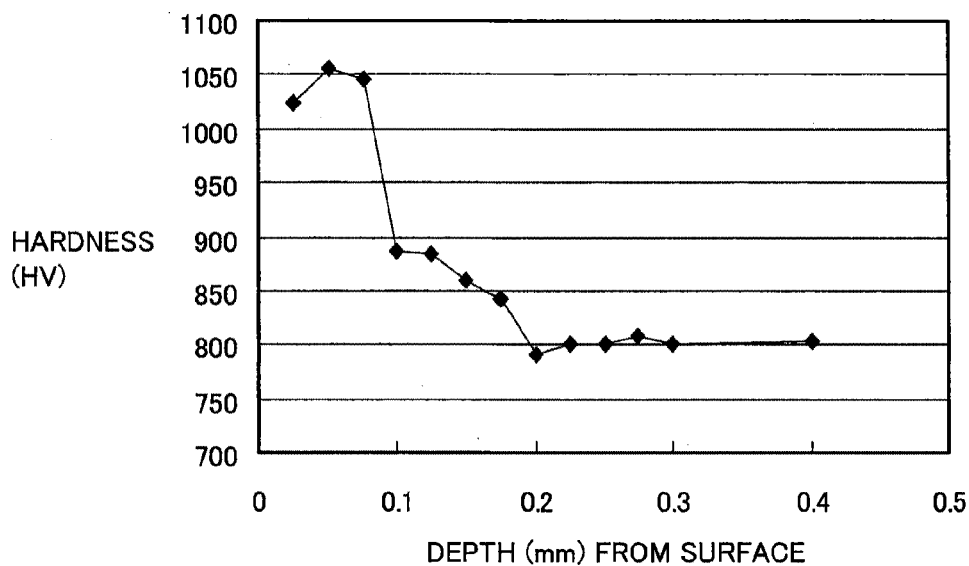
FIG. 18 illustrates a hardness distribution around the surface of comparative example A.
Figure 19:
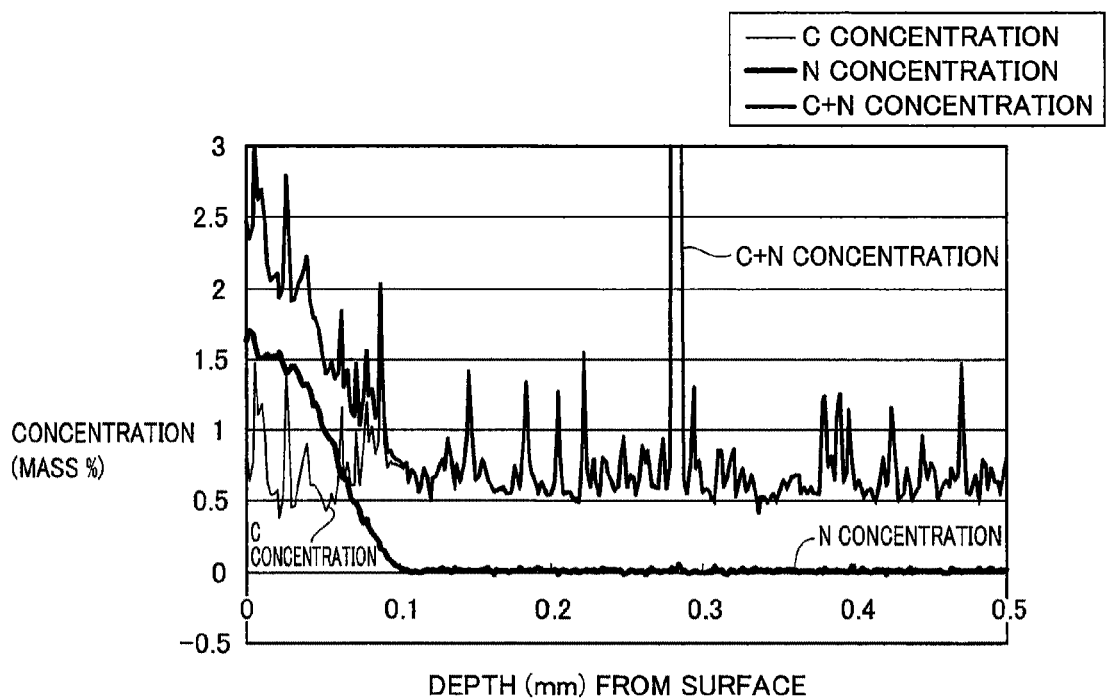
FIG. 19 illustrates distributions of concentrations of carbon and nitrogen around the surface of comparative example A.

The results of the experiment are now described with reference to FIGS. 14 to 19. Referring to FIGS. 14 and 17, upper portions of photographs correspond to the surfaces of the samples. Referring to FIGS. 15 and 18, the axes of abscissas show depths (distances) from the surfaces, and the axes of ordinates show hardness levels (Vickers hardness). Referring to FIGS. 16 and 19, the axes of abscissas show the depths (distances) from the surfaces and the axes of ordinates show the concentrations of carbon and nitrogen, while carbon concentrations (C concentrations), nitrogen concentrations (N concentrations) and totals (C+N concentrations) of the carbon concentrations and the nitrogen concentrations are shown in these drawings.

Referring to FIG. 14, no grain boundary deposit (nitride of iron having an aspect ratio of at least 2 and a length of at least 7.5 μm) is observed on the surface layer portion of the sample according to Example A of the present invention, and the sample has an excellent microstructure. Referring to FIGS. 15 and 16, a region of the sample according to Example A within 0.05 mm in depth from the surface has sufficient hardness of at least 950 HV, with penetration of a sufficient quantity of nitrogen. When finishing such as polishing is performed on the surface of a steel member subjected to a heat treatment similar to that in Example A, therefore, a race member provided with a nitrogen-enriched layer having a nitrogen concentration of at least 0.05 mass %, a total of a carbon concentration and the nitrogen concentration of at least 0.82 mass % and not more than 1.9 mass %, a thickness of at least 0.05 mm and hardness of at least 830 HV can be manufactured so that the number of grain boundary deposits is not more than one in five fields of square regions of 150 μm on each side when the nitrogen-enriched layer is observed with a microscope.

Referring to FIG. 17, on the other hand, a large number of grain boundary deposits 90 are observed in the surface layer portion of the sample according to comparative example, A out of the range of the present invention. Referring to FIGS. 18 and 19, a region of the sample according to comparative example A within 0.05 mm in depth from the surface has sufficient hardness of at least 950 HV with penetration of a sufficient quantity of nitrogen, similarly to the sample according to Example A. When finishing such as polishing is performed on the surface of a steel member subjected to a heat treatment similar to that in comparative example A, therefore, a component having grain boundary deposits remaining in a surface layer portion is obtained, although the surface layer portion thereof has high hardness. This component cannot be regarded as having sufficient fatigue resistance and toughness as described above.

Thus, it has been confirmed that a race member made of steel containing at least 3.75 mass % of chromium and provided with a nitrogen-enriched layer formed on a surface layer portion thereof while sufficiently ensuring fatigue strength and toughness can be manufactured according to the method of manufacturing a race member employing the heat treatment method according to each of the aforementioned embodiments.

Example 2

Example 2 of the present invention is now described. An experiment of investigating the proper range of the heating temperature in the diffusion step of the heat treatment method described with reference to the first embodiment was conducted. The procedure of the experiment is as follows:

First, a test piece having an outer diameter φ of 40 mm, an inner diameter φ of 30 mm and a thickness t of 16 mm was manufactured by preparing a steel member made of AMS 6490 (AISI M50) containing at least 0.77 mass % and not more than 0.85 mass % of carbon, at least 0.01 mass % and not more than 0.25 mass % of silicon, at least 0.01 mass % and not more than 0.35 mass % of manganese, at least 0.01 mass % and not more than 0.15 mass % of nickel, at least 3.75 mass % and not more than 4.25 mass % of chromium, at least 4 mass % and not more than 4.5 mass % of molybdenum and at least 0.9 mass % and not more than 1.1 mass % of vanadium with the rest consisting of iron and impurities and working the same.

Then, the steps from the quenching step to the third tempering step included in the heat treatment step employing the method of heat-treating steel described with reference to FIG. 5 were carried out on this test piece similarly to the case of Example A in the aforementioned Example 1. Then, a step similar to the diffusion step was carried out by maintaining the test piece at temperatures of 430° C. to 570° C. for various times, and hardness of the test piece was measured. The results of the measurement were analyzed on the basis of reaction kinetics, for calculating the relation between the heat treatment time (diffusion time) at each heating temperature in the diffusion step and the hardness.

On the other hand, another experiment was conducted by carrying out the steps from the quenching step to the third tempering step on a similar test piece similarly to the case of Example A in the aforementioned Example 1 and thereafter actually performing a plasma nitriding step and a diffusion step, for confirming a hardness distribution in the test piece. In the plasma nitriding step, plasma nitriding was performed by controlling a discharge voltage and a discharge current in the ranges of at least 200 V and not more than 450 V and at least 1 A and not more than 5 A respectively so that the treatment temperature $T_6$ in the plasma nitriding was 480° C. and maintaining the test piece at this temperature for one hour. In the plasma nitriding step, further, gas was introduced into a furnace in the ratio of nitrogen ($N_2$):hydrogen ($H_2$)=1:1 so that the pressure in the furnace was at least 267 Pa and not more than 400 Pa in the plasma nitriding. In addition, the diffusion step was carried out on the test piece completely subjected to the plasma nitriding step by maintaining the same at 480° C. for 50 hours. A hardness distribution on a surface layer portion of the test piece was measured before and after the diffusion step.

Figure 20:
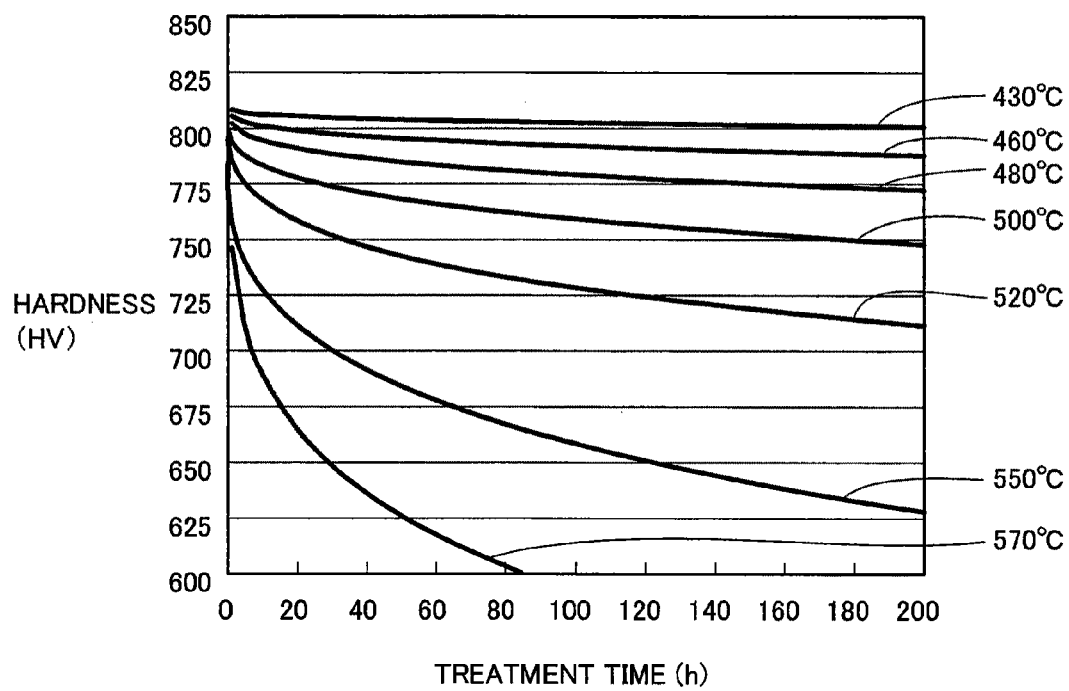
FIG. 20 is a diagram (Avrami's plot) showing the relation between heat treatment times at respective heating temperatures in a diffusion step and the hardness levels of test pieces.
Figure 21:
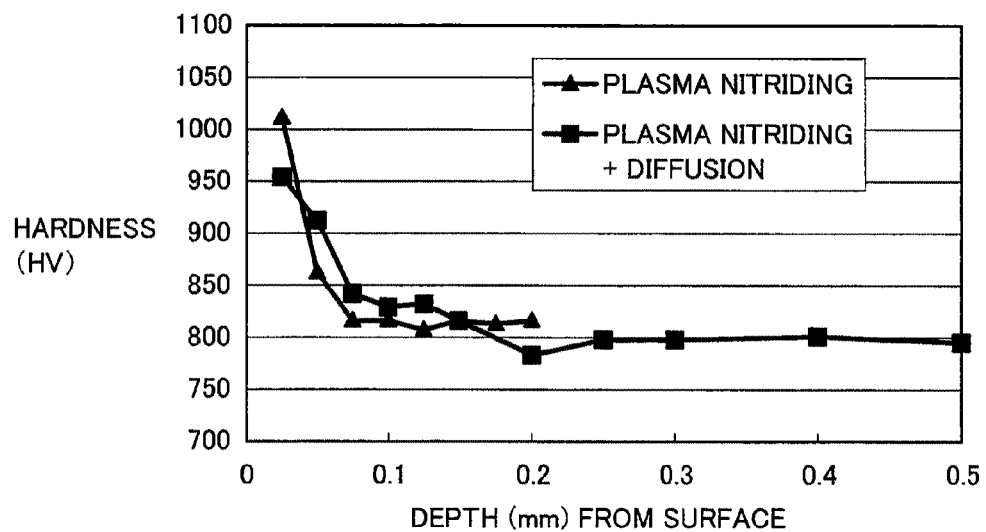
FIG. 21 illustrates hardness distributions on surface layer portions of test pieces before and after a diffusion step of maintaining the test pieces at 480° C. for 50 hours.

The results of the experiments are now described with reference to FIGS. 20 and 21. Referring to FIG. 20, the axis of abscissas shows heat treatment times (diffusion times), and the axis of ordinates shows hardness levels of the test pieces. Referring to FIG. 21, the axis of abscissas shows depths (distances) from the surfaces, and the axis of ordinates shows hardness levels. Referring to FIG. 21, triangles show hardness levels of the test pieces not yet subjected to the diffusion steps, and squares show hardness levels of the test pieces subjected to the diffusion steps of maintaining the same at 480° C. for 50 hours.

Referring to FIG. 20, the hardness of each test piece is reduced in a shorter time as the diffusion temperature is increased, while the reduction in the hardness is not more than 40 HV even if the diffusion treatment is performed for 200 hours and influence exerted by the reduction in the hardness (hardness in a region not influenced by penetration of nitrogen resulting from the plasma nitriding) of the matrix on the hardness of the surface layer portion is reduced when the diffusion temperature reaches 480° C. When the diffusion temperature reaches 460° C., the reduction in the hardness is not more than 25 HV even if the diffusion treatment is performed for 200 hours, and influence exerted by the reduction in the hardness of the matrix on the hardness of the surface layer portion is further reduced. When the diffusion temperature reaches 430° C., the reduction in the hardness is not more than 10 HV even if the diffusion treatment is performed for 200 hours, and the reduction in the hardness of the matrix hardly influences the hardness of the surface layer portion.

Referring to FIG. 21, on the other hand, the actual reduction in the hardness of the matrix substantially coincides with the results of analysis shown in FIG. 20 when the diffusion step of maintaining each test piece at 480° C. for 50 hours is carried out, and the results of analysis shown in FIG. 20 conceivably coincide with the results of the actual heat treatment.

From the aforementioned results of the experiments, the heating temperature (diffusion temperature) in the diffusion step must be set to not more than 480° C., and is preferably set to not more than 460° C., in view of making nitrogen penetrating into steel reach a desired region while suppressing influence exerted by reduction in the hardness of the matrix on the hardness of the surface layer portion. When the heating temperature is set to not more than 430° C., the diffusion step can be carried out while hardly exerting influence by reduction in the hardness of the matrix on the hardness of the surface layer portion. While the heating temperature in the diffusion step is preferably further reduced in view of suppressing influence exerted by reduction in the hardness of the matrix on the hardness of the surface layer portion, this heating temperature is preferably set to at least 300° C., in order to prevent the time required for making nitrogen penetrating into steel reach the desired region from being increased beyond an allowable limit in actual production steps.

Example 3

Example 3 of the present invention is now described. Nitrogen-enriched layers were formed on regions including rolling surfaces with the heat treatment method described with reference to the aforementioned first embodiment, and an experiment of confirming improvement in durability of a rolling bearing with these nitrogen-enriched layers was formed. The procedure of the experiment is as follows:

First, methods of manufacturing test bearings are described. An inner ring, an outer ring and balls of JIS 6206 provided with nitrogen-enriched layers on rolling surfaces thereof were prepared by employing AISI M50 as the material and carrying out the steps (S10) to (S90) shown in FIG. 4 similarly to the case of the first embodiment. Then, the inner ring, the outer ring and the balls were assembled into a bearing (Example). On the other hand, an inner ring, an outer ring and balls having no nitrogen-enriched layers on rolling surfaces thereof were also prepared through a similar process while omitting the steps (S70) and (S80), and assembled into a bearing of JIS 6206 (comparative example).

Test conditions are now described. A load of 6.9 kN was radially applied to each of the test bearings according to Example and comparative example, and the test bearing was rotated at a rotational speed of 2000 rpm in a contaminated environment lubricated with lubricating oil to which powder of alumina having grain diameters of 45 μm to 105 μm was added by 0.4 g per liter. A time up to cracking on any rolling surface was recorded as the life of the test bearing. This test was conducted on nine test bearings and the results were statistically processed to calculate a life ($L_{10}$ life) exhibiting a cumulative fracture probability of 10%. This $L_{10}$ life was evaluated through the ratio to the $L_{10}$ life of comparative example. In a similar test, a time (vibrational value increase time) from the start of the test up to increase of a vibrational value (vibration acceleration) by 0.1 G was investigated, and this vibrational value increase time was evaluated through the ratio to the vibrational value increase time of comparative example.

Figure 22:
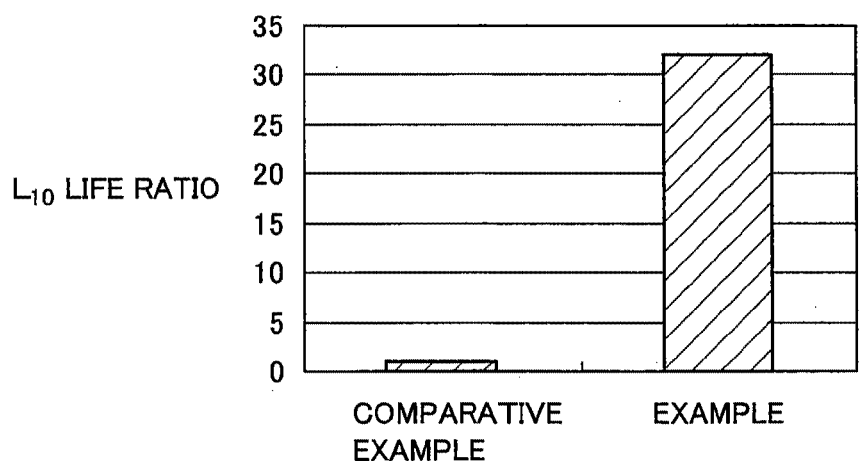
FIG. 22 illustrates results of investigation of $L_{10}$ lives in Example 3.
Figure 23:
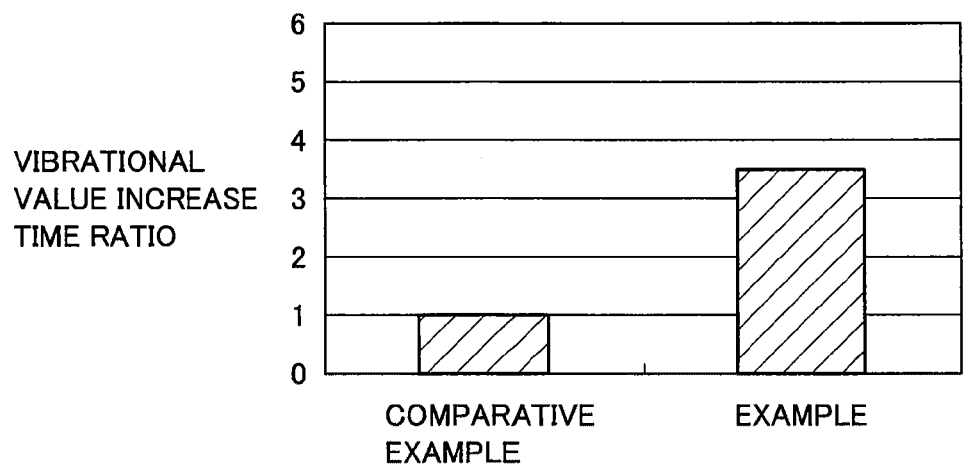
FIG. 23 illustrates results of investigation of vibrational value increase times in Example 3.

The results of the tests are now described with reference to FIGS. 22 and 23. Referring to FIG. 22, the axis of ordinates shows the ratio of the $L_{10}$ life to that of comparative example. Referring to FIG. 23, the axis of ordinates shows the ratio of the vibrational value increase time to that of comparative example.

Referring to FIGS. 22 and 23, the life in the contaminated environment and the vibrational value increase time of Example are at least 30 times and at least 3.5 times those of comparative example even if the same materials are employed, due to the formation of the nitrogen-enriched layers. Thus, it has been confirmed that the durability of the rolling bearing can be remarkably improved by forming nitrogen-enriched layers by a heat treatment method similar to that in the aforementioned first embodiment.

Example 4

Example 4 of the present invention is now described. A sample having a structure similar to that of the race member constituting the rolling bearing according to the aforementioned second aspect of the present invention was actually prepared by employing the heat treatment method in the aforementioned fourth embodiment, and subjected to an experiment of confirming that formation of grain boundary deposits was suppressed on a surface layer portion. The procedure of the experiment is as follows:

First, a test piece having an outer diameter φ of 40 mm, an inner diameter φ of 30 mm and a thickness t of 16 mm was manufactured by preparing a steel member made of AMS 6278 (AISI M50 NiL) containing at least 0.11 mass % and not more than 0.15 mass % of carbon, at least 0.1 mass % and not more than 0.25 mass % of silicon, at least 0.15 mass % and not more than 0.35 mass % of manganese, at least 3.2 mass % and not more than 3.6 mass % of nickel, at least 4 mass % and not more than 4.25 mass % of chromium, at least 4 mass % and not more than 4.5 mass % of molybdenum and at least 1.13 mass % and not more than 1.33 mass % of vanadium with the rest consisting of iron and impurities and working the same.

Then, a heat treatment step employing the heat treatment method described with reference to FIG. 12 in the aforementioned fourth embodiment was carried out on this test piece. The temperatures $T_{11}$, $T_{12}$, $T_{13}$, $T_{14}$, $T_{15}$ and $T_{16}$ and the times $t_{11}$, $t_{12}$, $t_{13}$, $t_{14}$, $t_{15}$ and $t_{16}$ were so set that the hardness of the test piece after the third tempering step was at least 58 HRC and not more than 65 HRC, while the temperatures $T_{17}$ and $T_{18}$ were set to 430° C. respectively and the times $t_{17}$ and $t_{18}$ were set to 10 hours and 160 hours respectively. In the plasma nitriding step, the discharge voltage and the discharge current were controlled in the ranges of at least 200 V and not more than 450 V and at least 1 A and not more than 5 A respectively, so that the treatment temperature $T_{17}$ in the plasma nitriding was 430° C. In the plasma nitriding step, further, gas was introduced into a furnace in the ratio of nitrogen ($N_2$):hydrogen ($H_2$)=1:1 so that the pressure in the furnace was at least 267 Pa and not more than 400 Pa in the plasma nitriding.

The diffusion step was so carried out that the test piece was heated in an atmosphere furnace with a nitrogen atmosphere to adjust the total of a carbon concentration and a nitrogen concentration in the surface of the test piece being not more than 1.9 mass %. The test piece subjected to the heat treatment step similar to that in the aforementioned fourth embodiment was employed as the sample according to Example of the present invention (Example B).

On the other hand, a heat treatment step similar to the heat treatment method described in the aforementioned fourth embodiment with reference to FIG. 12 was carried out on a similarly prepared test piece of AMS 6278 without carrying out the diffusion step. The temperatures $T_{11}$, $T_{12}$, $T_{13}$, $T_{14}$, $T_{15}$ and $T_{16}$ and the times $t_{11}$, $t_{12}$, $t_{13}$, $t_{14}$, $t_{15}$ and $t_{16}$ were so set that the hardness of the test piece after the third tempering step was at least 58 HRC and not more than 65 HRC, while the temperature $T_{17}$ was set to 480° C. and the time $t_{17}$ was set to 30 hours. In the plasma nitriding step, the discharge voltage and the discharge current were controlled in the ranges of at least 200 V and not more than 450 V and at least 1 A and not more than 5 A respectively, so that the treatment temperature $T_{17}$ in the plasma nitriding was 480° C. In the plasma nitriding step, further, gas was introduced into a furnace in the ratios of nitrogen ($N_2$):hydrogen ($H_2$):methane ($CH_4$)=79:80:1 so that the pressure in the furnace was at least 267 Pa and not more than 400 Pa in the plasma nitriding. The test piece subjected to the aforementioned heat treatment step was employed as a sample according to comparative example (comparative example B).

The samples according to Example B and comparative example B prepared in the aforementioned manner were cut along sections perpendicular to the surfaces thereof, and these sections were polished. Further, the polished sections were etched with a etchant, and five fields of square regions of 150 μm on each side including the surface were thereafter randomly observed on each sample.

Figure 24:
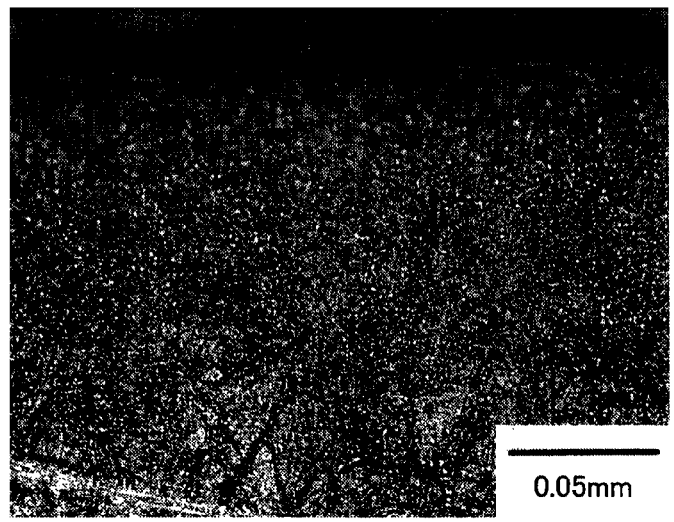
FIG. 24 is an optical micrograph of a microstructure around the surface of Example B.
Figure 25:
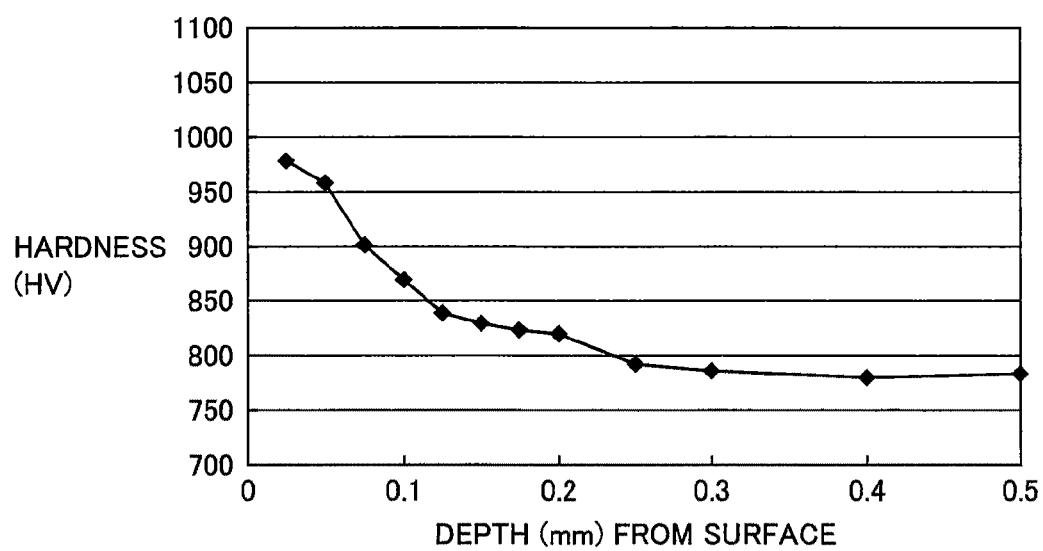
FIG. 25 illustrates a hardness distribution around the surface of Example B.
Figure 26:
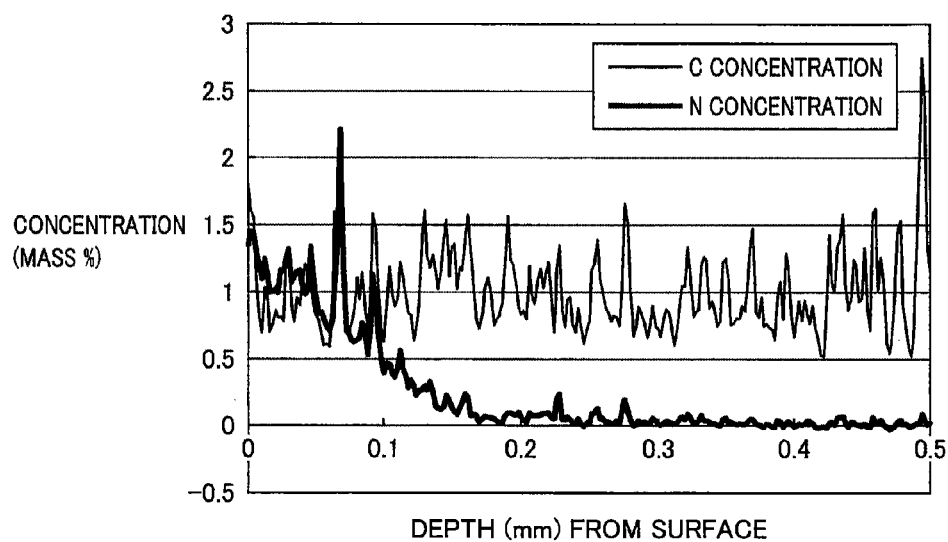
FIG. 26 illustrates distributions of concentrations of carbon and nitrogen around the surface of Example B.
Figure 27:
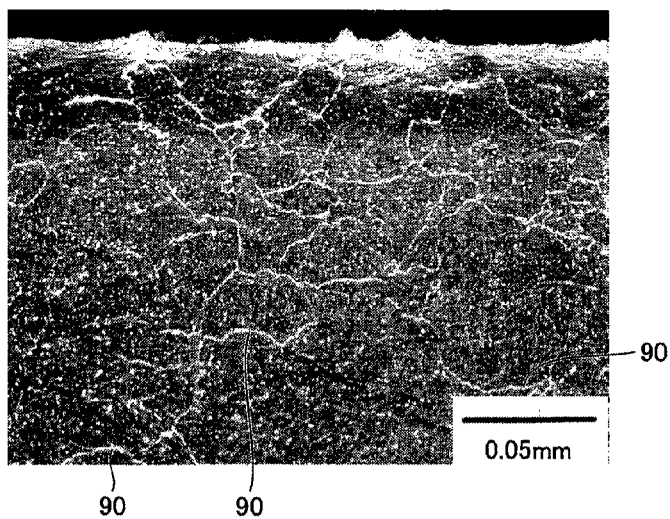
FIG. 27 is an optical micrograph of a microstructure around the surface of comparative example B.
Figure 28:
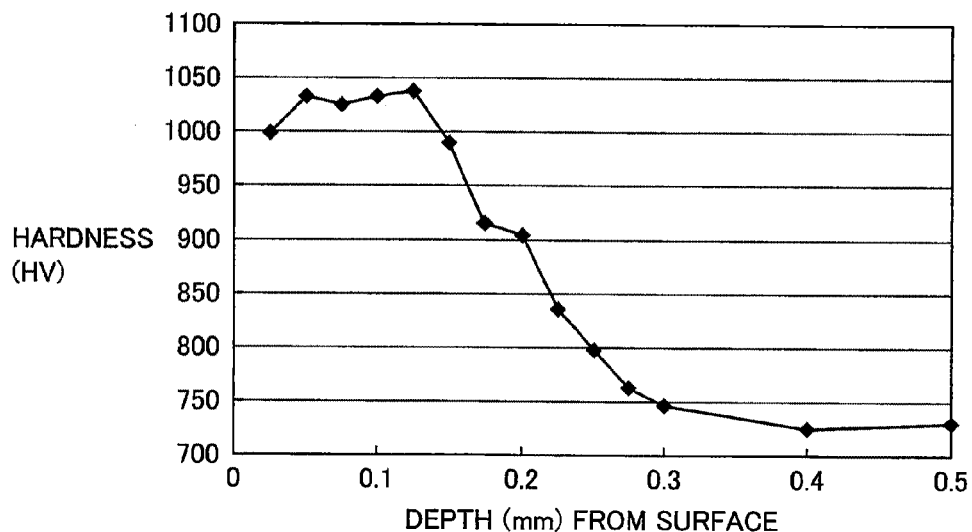
FIG. 28 illustrates a hardness distribution around the surface of comparative example B.
Figure 29:
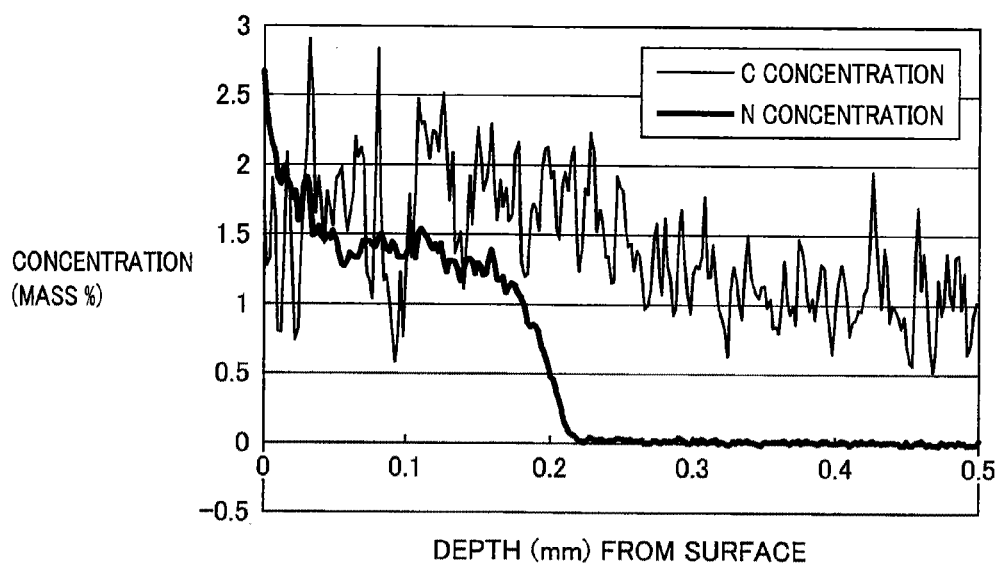
FIG. 29 illustrates distributions of concentrations of carbon and nitrogen around the surface of comparative example B.

The results of the experiment are now described with reference to FIGS. 24 to 29. Referring to FIGS. 24 and 27, upper portions of photographs correspond to the surfaces of the samples. Referring to FIGS. 25 and 28, the axes of abscissas show depths (distances) from the surfaces, and the axes of ordinates show hardness levels (Vickers hardness). Referring to FIGS. 26 and 29, the axes of abscissas show the depths (distances) from the surfaces, and the axes of ordinates show the concentrations of carbon and nitrogen with thin lines and thick lines respectively.

Referring to FIG. 24, no grain boundary deposit (nitride of iron having an aspect ratio of at least 2 and a length of at least 7.5 μm) is observed on the surface layer portion of the sample according to Example B of the present invention, and the sample has an excellent microstructure. Referring to FIGS. 25 and 26, a region of the sample according to Example B within 0.05 mm in depth from the surface has sufficient hardness of at least 950 HV, with penetration of a sufficient quantity of nitrogen. When finishing such as polishing is performed on the surface of a steel member subjected to a heat treatment similar to that in Example B, therefore, a mechanical component provided with a nitrogen-enriched layer having a nitrogen concentration of at least 0.05 mass %, a total of a carbon concentration and the nitrogen concentration of at least 0.55 mass % and not more than 1.9 mass %, a thickness of at least 0.05 mm and hardness of at least 800 HV can be manufactured so that the number of grain boundary deposits is not more than one in five fields of square regions of 150 μm on each side when the nitrogen-enriched layer is observed with a microscope.

Referring to FIG. 27, on the other hand, a large number of grain boundary deposits 90 are observed in the surface layer portion of the sample according to comparative example B out of the range of the present invention. Referring to FIGS. 28 and 29, a region of the sample according to comparative example B within 0.05 mm in depth from the surface has sufficient hardness of at least 950 HV with penetration of a sufficient quantity of nitrogen, similarly to the sample according to Example B. When finishing such as polishing is performed on the surface of a steel member subjected to a heat treatment similar to that in comparative example B, therefore, a mechanical component having grain boundary deposits remaining in a surface layer portion is obtained although the surface layer portion thereof has high hardness. This mechanical component cannot be regarded as having sufficient fatigue resistance and toughness as described above.

Thus, it has been confirmed that a race member made of steel containing at least 4 mass % of chromium and provided with a nitrogen-enriched layer formed on a surface layer portion thereof while sufficiently ensuring fatigue strength and toughness can be manufactured according to the method of manufacturing a race member employing the heat treatment method according to the aforementioned fourth embodiment.

Example 5

Example 5 of the present invention is now described. An experiment of investigating the proper range of the heating temperature in the diffusion step of the heat treatment method described with reference to the aforementioned fourth embodiment was conducted. The procedure of the experiment is as follows:

First, a test piece having an outer diameter φ of 40 mm, an inner diameter φ of 30 mm and a thickness t of 16 mm was manufactured by preparing a steel member made of AMS 6278 (AISI M50 NiL) containing at least 0.11 mass % and not more than 0.15 mass % of carbon, at least 0.1 mass % and not more than 0.25 mass % of silicon, at least 0.15 mass % and not more than 0.35 mass % of manganese, at least 3.2 mass % and not more than 3.6 mass % of nickel, at least 4 mass % and not more than 4.25 mass % of chromium, at least 4 mass % and not more than 4.5 mass % of molybdenum and at least 1.13 mass % and not more than 1.33 mass % of vanadium with the rest consisting of iron and impurities and working the same.

Then, the steps from the carburizing step to the third tempering step included in the heat treatment step employing the method of heat-treating steel described in the aforementioned fourth embodiment with reference to FIG. 12 were carried out on this test piece similarly to the case of Example B in the aforementioned Example 4. A step similar to the diffusion step was carried out by maintaining the test piece at temperatures of 430° C. to 570° C. for various times, and hardness of a carburized layer was measured. More specifically, hardness was measured on nine points in a region having a distance of at least 0.2 mm and not more than 0.4 mm from the surface of the test piece, and the lowest hardness was calculated. The results of the measurement were analyzed on the basis of reaction kinetics, for calculating the relation between the heat treatment time (diffusion time) at each heating temperature in the diffusion step and the hardness of the carburized layer.

On the other hand, another experiment was conducted by carrying out the steps from the carburizing step to the third tempering step on a similar test piece similarly to the case of Example B in the aforementioned Example 4 and actually performing a plasma nitriding step and a diffusion step for confirming a hardness distribution in the test piece. In the plasma nitriding step, plasma nitriding was performed by controlling a discharge voltage and a discharge current in the ranges of at least 200 V and not more than 450 V and at least 1 A and not more than 5 A respectively so that the treatment temperature $T_{17}$ in the plasma nitriding was 480° C. and maintaining the test piece at this temperature for one hour. In the plasma nitriding step, further, gas was introduced into a furnace in the ratio of nitrogen ($N_2$):hydrogen ($H_2$)=1:1 so that the pressure in the furnace was at least 267 Pa and not more than 400 Pa in the plasma nitriding. In addition, the diffusion step was carried out on the test piece completely subjected to the plasma nitriding step by maintaining the same at 480° C. for 50 hours. A hardness distribution on a surface layer portion of the test piece was measured before and after the diffusion step.

Figure 30:
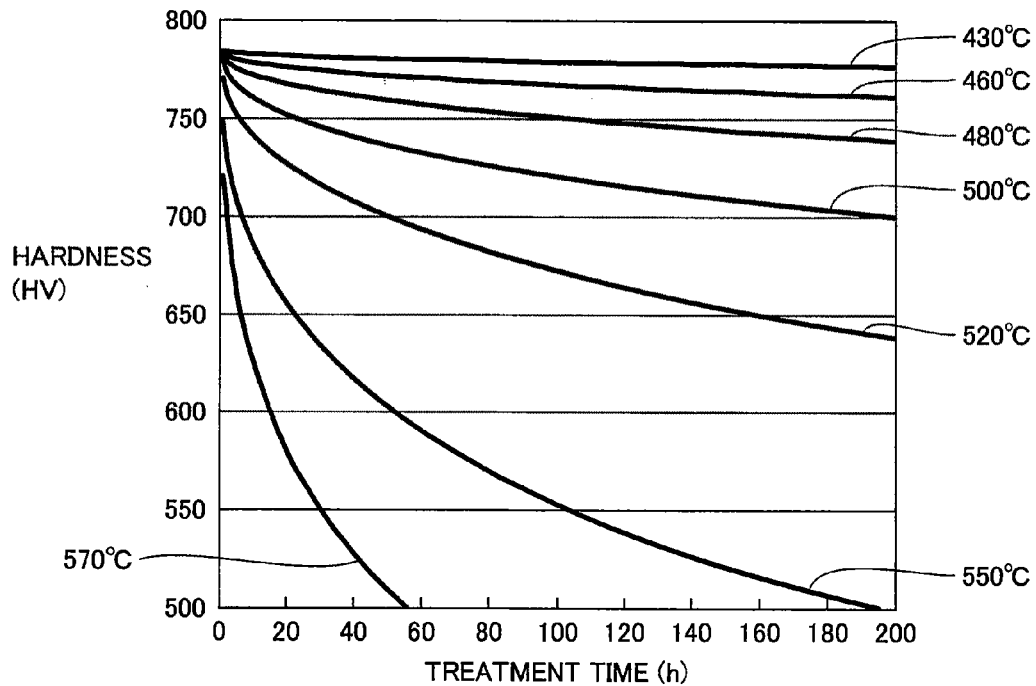
FIG. 30 is a diagram (Avrami's plot) showing the relation between heat treatment times (diffusion times) at respective heating temperatures in a diffusion step and the hardness levels of carburized layers.
Figure 31:
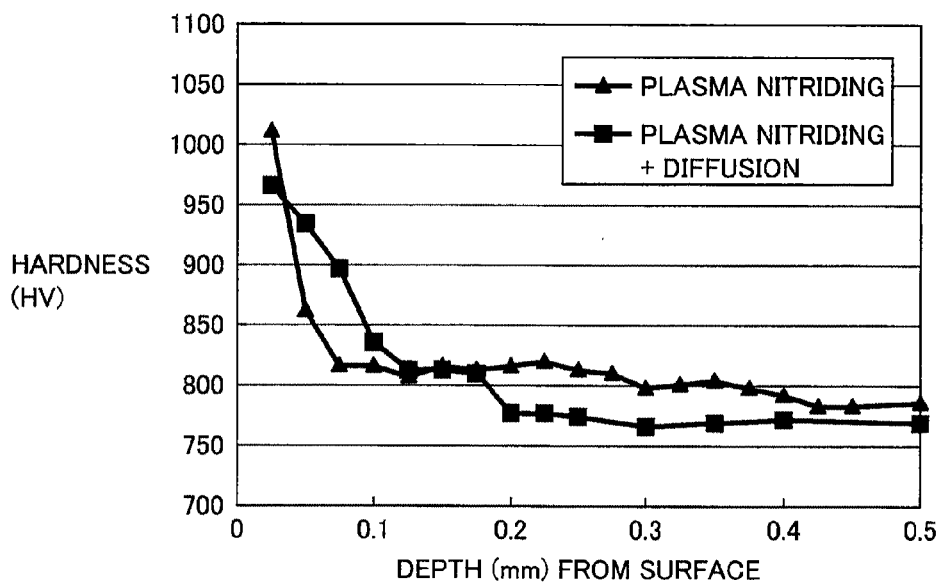
FIG. 31 illustrates hardness distributions on surface layer portions of test pieces before and after a diffusion step of maintaining the test pieces at 480° C. for 50 hours.

The results of the experiments are now described with reference to FIGS. 30 and 31. Referring to FIG. 30, the axis of abscissas shows heat treatment times (diffusion times), and the axis of ordinates shows hardness levels of the carburized layer. Referring to FIG. 31, the axis of abscissas shows depths (distances) from the surfaces, and the axis of ordinates shows hardness levels. Referring to FIG. 31, triangles show hardness levels of the test pieces not yet subjected to the diffusion steps, and squares show hardness levels of the test pieces subjected to the diffusion steps of maintaining the same at 480° C. for 50 hours.

Referring to FIG. 30, the hardness of each test piece is reduced in a shorter time as the diffusion temperature is increased, while the reduction in the hardness is not more than 50 HV even if the diffusion treatment is performed for 200 hours and influence exerted by reduction in the hardness (hardness in a region of the carburized layer not influenced by penetration of nitrogen resulting from plasma nitriding) of the matrix on the hardness of the surface layer portion is reduced when the diffusion temperature reaches 480° C. When the diffusion temperature reaches 460° C., the reduction in the hardness is not more than 30 HV even if the diffusion treatment is performed for 200 hours, and influence exerted by the reduction in the hardness of the matrix on the hardness of the surface layer portion is further reduced. When the diffusion temperature reaches 430° C., the reduction in the hardness is not more than 10 HV even if the diffusion treatment is performed for 200 hours, and the reduction in the hardness of the matrix hardly influences the hardness of the surface layer portion.

Referring to FIG. 31, on the other hand, the actual reduction in the hardness of the matrix substantially coincides with the results of analysis shown in FIG. 30 when the diffusion step of maintaining each test piece at 480° C. for 50 hours is carried out, and the results of analysis shown in FIG. 30 conceivably coincide with the results of the actual heat treatment.

From the aforementioned results of the experiments, the heating temperature (diffusion temperature) in the diffusion step must be set to not more than 480° C., and is preferably set to not more than 460° C., in view of making nitrogen penetrating into steel reach a desired region while suppressing influence exerted by reduction in the hardness of the matrix on the hardness of the surface layer portion. When the heating temperature is set to not more than 430° C., the diffusion step can be carried out while hardly exerting influence by reduction in the hardness of the matrix on the hardness of the surface layer portion. While the heating temperature in the diffusion step is preferably further reduced in view of suppressing influence exerted by reduction in the hardness of the matrix on the hardness of the surface layer portion, this heating temperature is preferably set to at least 300° C., in order to prevent the time required for making nitrogen penetrating into steel reach the desired region from being increased beyond an allowable limit in actual production steps.

Example 6

Example 6 of the present invention is now described. Nitrogen-enriched layers were formed on regions including rolling surfaces with the heat treatment method described with reference to the aforementioned fourth embodiment, and an experiment of confirming improvement in durability of a rolling bearing with these nitrogen-enriched layers was conducted. The procedure of the experiment is as follows:

First, methods of manufacturing test bearings are described. An inner ring, an outer ring and balls of JIS 6206 provided with nitrogen-enriched layers on rolling surfaces thereof were prepared by employing AISI M50 NiL as the material and carrying out the steps (S510) to (S610) shown in FIG. 11 similarly to the case of the fourth embodiment. Then, the inner ring, the outer ring and the balls were assembled into a bearing (Example). On the other hand, an inner ring, an outer ring and balls having no nitrogen-enriched layers on rolling surfaces thereof were also prepared through a similar process while omitting the steps (S590) and (S600), and assembled into a bearing of JIS 6206 (comparative example).

Test conditions are now described. A load of 6.9 kN was radially applied to each of the test bearings according to Example and comparative example, and the test bearing was rotated at a rotational speed of 2000 rpm in a contaminated environment lubricated with lubricating oil to which powder of alumina having grain diameters of 45 μm to 105 μm was added by 0.4 g per liter. A time up to cracking on any rolling surface was recorded as the life. This test was conducted on nine test bearings and the results were statistically processed to calculate a life ($L_{10}$ life) exhibiting a cumulative fracture probability of 10%. This $L_{10}$ life was evaluated through the ratio to the $L_{10}$ life of comparative example.

Figure 32:
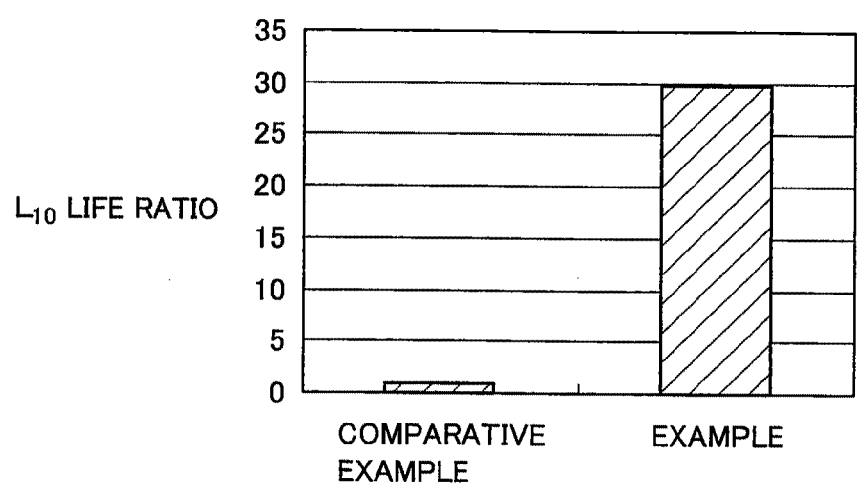
FIG. 32 illustrates results of investigation of $L_{10}$ lives in Example 6.

The results of the tests are now described with reference to FIG. 32. Referring to FIG. 32, the axis of ordinates shows the ratio of the $L_{10}$ life to that of comparative example.

Referring to FIG. 32, the life of Example in the contaminated environment is at least 30 times that of comparative example even if the same materials are employed, due to the formation of the nitrogen-enriched layers. Thus, it has been confirmed that the durability of the rolling bearing can be remarkably improved by forming nitrogen-enriched layers by a heat treatment method similar to that in the aforementioned fourth embodiment.

The rolling bearing according to the present invention can be particularly advantageously applied to a rolling bearing to which improvement of durability under severe conditions is required.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A rolling bearing comprising:
a race member constituted of a steel matrix containing at least 0.77 mass % and not more than 0.85 mass % of carbon, at least 0.01 mass % and not more than 0.25 mass % of silicon, at least 0.01 mass % and not more than 0.35 mass % of manganese, at least 0.01 mass % and not more than 0.15 mass % of nickel, at least 3.75 mass % and not more than 4.25 mass % of chromium, at least 4 mass % and not more than 4.5 mass % of molybdenum and at least 0.9 mass % and not more than 1.1 mass % of vanadium with the rest consisting of iron and impurities and provided with a nitrogen-enriched layer having a nitrogen concentration of at least 0.05 mass % formed on a region including a surface so that a total of a carbon concentration and said nitrogen concentration in said nitrogen-enriched layer is at least 0.82 mass % and not more than 1.9 mass % throughout all of the nitrogen-enriched layer of the matrix;
a plurality of rolling elements, in contact with said race member, arranged on an annular race; and
a cage retaining said rolling elements on said race, wherein
said race member includes a race member contact surface in contact with said cage,
said cage includes a cage contact surface in contact with said race member, and
an anti-seizure layer made of a material different from the material constituting said race member is arranged on a region including at least either said race member contact surface or said cage contact surface.

2. The rolling bearing according to claim 1, wherein said anti-seizure layer is made of diamond-like carbon.

3. The rolling bearing according to claim 1, wherein said anti-seizure layer is made of resin having a coefficient of dynamic friction lower than the coefficient of dynamic friction of steel.

4. The rolling bearing according to claim 3, wherein said resin having a coefficient of dynamic friction lower than the coefficient of dynamic friction of steel has a porous structure, to be impregnable with a lubricant.

5. The rolling bearing according to claim 1, wherein the thickness of said nitrogen-enriched layer is at least 0.05 mm.

6. The rolling bearing according to claim 1, wherein said nitrogen-enriched layer has hardness of at least 830 HV.

7. The rolling bearing according to claim 1, wherein a number of nitrides of iron, each having an aspect ratio of at least 2 and a length of 7.5 μm, is not more than one in five fields of square regions of 150 μm on each side when said nitrogen-enriched layer is observed with a microscope.

8. The rolling bearing according to claim 1, wherein said rolling elements are made of ceramics.

9. The rolling bearing according to claim 1, supporting a rotating member which is a main shaft or a member rotating upon rotation of said main shaft to be rotatable with respect to a member adjacent to said rotating member in a gas turbine engine.

* * * * *